United States Patent
Xu et al.

(10) Patent No.: US 12,531,083 B2
(45) Date of Patent: Jan. 20, 2026

(54) INTERACTIVE ARTIFICIAL INTELLIGENCE ANALYTICAL SYSTEM

(71) Applicant: TalkMeUp Inc., Pittsburgh, PA (US)

(72) Inventors: Yi Xu, Pittsburgh, PA (US); JiaoJiao Xu, Pittsburgh, PA (US); Chaaran Arunachalam, Pittsburgh, PA (US); Xinru Yan, Mountain View, CA (US); Yang Liu, Washington DC, DC (US); Honghao Chen, Pittsburgh, PA (US); Albert Topdjian, Pittsburgh, PA (US)

(73) Assignee: TalkMeUp Inc., Pittsburgh, PA (US)

( * ) Notice: Subject to any disclaimer, the term of this patent is extended or adjusted under 35 U.S.C. 154(b) by 352 days.

(21) Appl. No.: 18/157,554

(22) Filed: Jan. 20, 2023

(65) Prior Publication Data

US 2023/0260536 A1     Aug. 17, 2023

Related U.S. Application Data

(60) Provisional application No. 63/302,403, filed on Jan. 24, 2022.

(51) Int. Cl.
| | |
|---|---|
| *G10L 15/22* | (2006.01) |
| *G06F 40/30* | (2020.01) |
| *G06F 40/35* | (2020.01) |
| *G06N 20/00* | (2019.01) |
| *G06N 20/20* | (2019.01) |
| *G06V 40/20* | (2022.01) |
| *G10L 25/30* | (2013.01) |
| *G10L 25/48* | (2013.01) |
| *G10L 25/51* | (2013.01) |

(Continued)

(52) U.S. Cl.
CPC .............. *G10L 25/63* (2013.01); *G06F 40/30* (2020.01); *G06F 40/35* (2020.01); *G06V 40/20* (2022.01); *G10L 25/30* (2013.01); *H04L 51/02* (2013.01); *G06N 20/00* (2019.01); *G06N 20/20* (2019.01); *G10L 15/22* (2013.01); *G10L 25/48* (2013.01); *G10L 25/51* (2013.01)

(58) Field of Classification Search
None
See application file for complete search history.

(56) References Cited

U.S. PATENT DOCUMENTS

| | | |
|---|---|---|
| 5,583,961 A | 12/1996 | Pawlewski et al. |
| 12,141,539 B1 * | 11/2024 | Nichol ................... G06F 40/35 |
| 2014/0095401 A1 | 4/2014 | Merrill et al. |

(Continued)

OTHER PUBLICATIONS

Anderson, K. et al., "The Tard Is framework: intelligent virtual agents for social coaching in job interviews," 10th Intl. Conf. on Advances in Computer Entertainment, ACE 2013 (Nov. 2013) 17 pp. (Year: 2013).

Gucluturk, Y. et al., "Multimodal first impression analysis with deep residual networks," IEEE Trans. on Affective Computing, vol. 9, No. 3 (Jul.-Sep. 2018, available online at ieeexplore.ieee.org as of Sep. 12, 2017) pp. 316-329. (Year: 2017).

(Continued)

*Primary Examiner* — Richa Sonifrank
(74) *Attorney, Agent, or Firm* — Carnelian Law, LLC

(57) ABSTRACT

A method, system, and computer readable medium are disclosed to receive inputs from a user, send the inputs to an analytical system, transform the inputs into conversation features, send the conversation features to a decision system that, based on control settings, transforms the conversation features into user feedback and/or conversation pivot decisions, in order to operate a network of bot agents to service a conversation with the user.

4 Claims, 15 Drawing Sheets

(51) Int. Cl.
  *G10L 25/63* (2013.01)
  *H04L 51/02* (2022.01)

(56) References Cited

U.S. PATENT DOCUMENTS

| | | | |
|---|---|---|---|
| 2017/0213190 A1 | 7/2017 | Hazan | |
| 2018/0150739 A1 | 5/2018 | Wu | |
| 2019/0043069 A1 | 2/2019 | Lee et al. | |
| 2019/0378024 A1* | 12/2019 | Singh | G06N 5/043 |
| 2020/0160278 A1* | 5/2020 | Allen | G06F 16/35 |
| 2020/0382451 A1* | 12/2020 | Ogawa | G06F 3/015 |
| 2021/0249002 A1* | 8/2021 | Ahmadidaneshashtiani | H04L 51/02 |
| 2021/0407310 A1* | 12/2021 | Finch | G06F 40/40 |
| 2022/0293099 A1* | 9/2022 | Lee | G06F 3/167 |
| 2022/0350970 A1* | 11/2022 | Rizk | G06V 30/19007 |
| 2023/0326451 A1* | 10/2023 | Sundararajan | G10L 15/285 704/270 |

OTHER PUBLICATIONS

Hoque, Mohammed et al., "MACH My Automated Conversation coach", UbiComp 2013—Proceedings of the 2013 ACM International Joint Conference on Pervasive and Ubiquitous Computing, Dec. 2014.
Ji, S. et al., "3d convolutional neural networks for human action recognition," Proc. of the 27th Intl. Conf. on Machine Learning (2010) 8 pp. (Year: 2010).
PCT/US2019/048177 International Search Report Jan. 30, 2020.
PCT/US2019/048177 Written Opinion of the ISA Jan. 30, 2020.
Subramaniam et al., "Bi-modal First Impressions Recognition using Temporally Ordered Deep Audio and Stochastic Video Features", ECCV Workshops 2016, Oct. 31, 2019, pp. 1-13.
Zhang, Xiaozheng Jane et al, "Finding Lips in Unconstrained Imagery for Improved Automatic Speech Recognition" Advances in Visual Information Systems. Visual 2007. Lecture Notes in Computer Science, vol. 4781. Springer, Berlin, Heidelberg.

* cited by examiner

INTERACTIVE ARTIFICIAL INTELLIGENCE ANALYTICAL SYSTEM

CROSS-REFERENCE TO RELATED APPLICATIONS

This application claims the benefit of U.S. provisional patent application Ser. No. 63/302,403, filed on Jan. 24, 2022, the contents of which are incorporated herein by reference in their entirety.

BACKGROUND

Communications training or communication skills training refers to various types of training to develop the necessary skills for communication. Individuals may undergo communications training to develop and improve communication skills related to various roles in organizations. An effective communications trainer may assist organizational members in improving communications between sub-groups of the organization. Communications training may assist leaders to develop the ability to perceive how various individuals and subgroups relate to each other and make appropriate interventions.

Types of skill development related to communications training include listening skills, influence skills, responding to conflict, customer service, assertiveness skills, negotiation, facilitation, report writing (e.g., business and technical writing), public speaking and presentation, speaking skills, and interaction skills.

Due to the benefits of communication training in its various forms, there exists a clear need for individuals and organizations to improve their communication delivery assisted by technology to analyze visual and/or auditory data of the actual communicator (and groups thereof) and provide feedback to the communicator, the organization, and for the purpose of refining learning models to improve results over time.

BRIEF SUMMARY

In one aspect, a method is disclosed that includes receiving, by an active bot agent, inputs from a user. The method also includes sending, by the active bot agent, the inputs to an analytical system. The method also includes transforming, by the analytical system, the inputs into conversation features. The method also includes configuring the active bot agent and a plurality of bot agents with control settings including at least one of topic context, conversation context, conversation theme, preferred bot agent profile, defined conversation flow template, quantitative pivot rules, qualitative pivot rules, and combinations thereof, where each of the plurality of bot agents is associated with one or more topics. The method also includes receiving, by a decision system, the conversation features from the analytical system and the control settings. The method also includes transforming, by at least one machine learning model in the decision system, the conversation features into conversation pivot decisions and active bot feedback signals. The method also includes on condition no conversation pivot decision was made providing an active bot feedback signal to the user representing a reaction to the user input consistent with a currently identified topic. The method also includes on condition no conversation pivot decision was made on condition a conversation pivot decision was made providing the active bot feedback signals to the user representing a reaction to the user input not consistent with the currently identified topic, applying the conversation pivot decision to select a new active bot agent from the plurality of bot agents, to service a conversation with the user, and providing new active bot agent feedback signals to the user.

In another aspect, a system is disclosed including a plurality of bot agents; an active bot agent; a processor; and a memory storing instructions that, when executed by the processor, configure the apparatus to perform the disclosed method.

In another aspect, a non-transitory computer-readable storage medium is disclosed including instructions that when executed by a computer, cause the computer to implement the disclosed method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
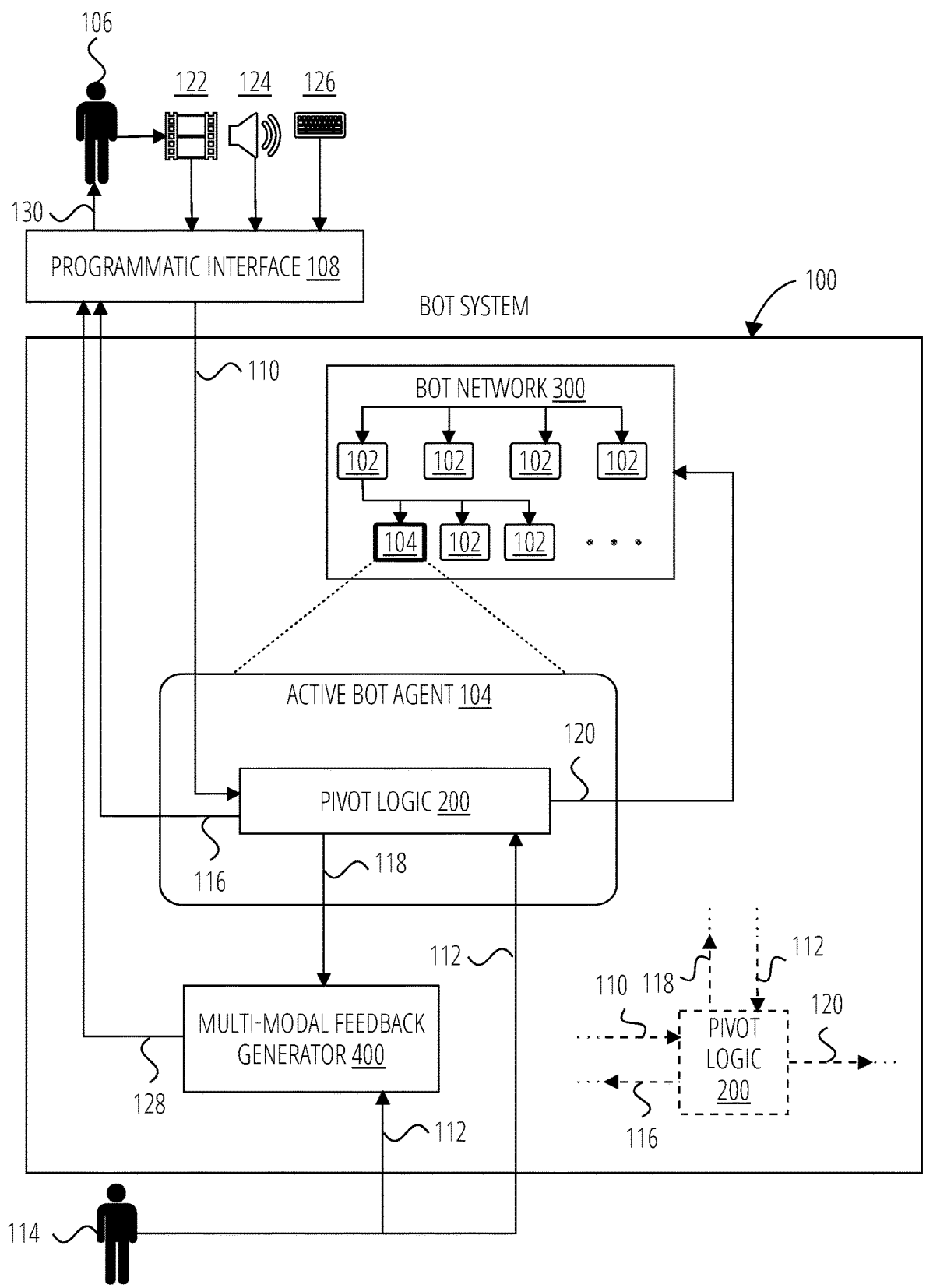
FIG. 1 depicts user and administrative interfaces to a bot system 100 in accordance with one embodiment.

Embodiments of systems and techniques are disclosed by which a person interacts with a "bot agent" on a particular topic of conversation. A bot agent is logic, typically embodied in software, that autonomously, or with some human guidance or control, receives inputs and responds with outputs. A bot agent may mimic, to some extent, the behavior of a human coach or service agent by answering questions and/or providing suggestions on improvements or changes to behavior.

The bot systems calculate "pivot points" for the interactions with the user, meaning they determine, based on a multi-modal analysis of a conversation with the user, whether to change the topic of the conversation, or whether to guide the conversation in a different direction.

Bot agents may be configured, e.g., by a system administrator, with settings to improve their ability to engage with particular users. For example, a bot agent may be configured with a certain "persona" and depth of technical knowledge to better match with the personality and skill level of a particular user or type of user.

The systems utilize multiple modalities of machine learning analysis. This may take the form of machine learning models trained on input tensors from heterogeneous sources (e.g., tensors characterizing text, audio, and video inputs from a user). Additionally or alternatively, this may involve distributing the generation of classifications of heterogeneous inputs over multiple machine learning models.

The systems provide interactive feedback to a trainee (system user) based on a computational analysis of a video/audio stream or recording of said trainee. The system provides analysis and personalized feedback based upon video and audio information gathered from a trainee. Video and audio capture may be accomplished through conventional mechanisms, e.g. cameras, microphones, etc. The feedback may take the form of recommendations for behavioral changes related to communication by the trainee. The recommendation is derived from the application of various practice settings including rubrics and content for integration.

The system comprises modules that process the video and audio information described above to create recommendations or scores, which may be evaluated in aggregate form or by individual communication attributes (e.g., enthusiasm, confidence, engagement, etc.). "Module" refers to logic organized in such a way as to comprise defined entry and exit points at its interface, for activation of functionality of the module by logic external to the module. The analyzers—both a video analyzer and audio analyzer—work individually and in combination where needed (e.g., providing inputs to an emotion detector). The video analyzer converts a video signal of the trainee's session into morphology feature predictions such as facial expression, eye contact, gesture and other visual attributes.

"Emotion detector" in this disclosure refers to a class of algorithms for detecting human emotion from speech audio and/or text. The technical discipline for developing emotion detectors is often referred to as Speech Emotion Recognition or SER for short. Speech emotion detectors may provide predictions or classifications of emotion states by identifying correlations between emotions and audio features such as pitch, loudness and energy. A number of well-known statistical pattern recognition techniques may also be utilized by emotion detectors. Commonly available open-source feature extraction libraries such as openSMILE may also be utilized along with online toolsets such as support vector machines by emotion detectors. "Library" refers to a collection of modules organized such that the functionality of all the modules may be included for use by software using references to the library in source code. "Support vector machine" or SVM refers to a class of supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. Techniques such as Platt scaling extend SVMs to apply a probabilistic classification. An SVM model is a representation of the examples as points in space, mapped so that the examples of the separate categories are divided by a clear gap. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. "Audio analyzer" refers to logic that receives digital audio signals and performs signal processing to extract audio features from the audio signals. Examples of audio features are tonal variance), enunciation metric, articulation metrics, and pacing metric. "Pacing metric" refers to a value indicative of the speed at which speech is delivered. "Video analyzer" refers to logic that receives digital video signals and performs signal processing to extract spatial, color, motion, object, and other features from the video signals.

"Articulation metric" refers to audio features indicative of clear speech articulation. Examples of articulation metrics include first and second formant measurements of produced vowels and consonants, size of articulation, and their formant dispersion. Certain phonetically rich words and phrases may be particularly useful for analysis of articulation. One type of algorithm for generating articulation metrics is a mixed density network, a class of models obtained by combining a conventional neural network with a mixture density model. Many other techniques for measuring articulation from audio signals are known in the art and applicable. "Enunciation metric" refers to a value indicative of effective articulation by a speaker regarded from the point of view of its intelligibility to the audience. "Tonal variance" refers to the variance of pitch in speech to distinguish lexical or grammatical meaning—that is, to distinguish or to inflect words. "Neural network" refers to an algorithm or computational system based on a collection of connected units or nodes called artificial neurons, which loosely model the neurons in a biological system. Each connection between neurons, like the synapses in a biological brain, may transmit a signal (an activation) from one artificial neuron to another. An artificial neuron that receives a signal (the input activation) may process it and then signal additional artificial neurons (the output activation) connected to it.

The audio analyzer similarly converts an audio signal accompanying the video signal into predictions of human speech features such as articulation and enthusiasm. Through a speech-to-text converter the audio signal may be further analyzed as text for items such as filler words, speech rate, content understanding, and optimal word choices. "Filler words" refer to spoken sounds or words indicating a pause to think without giving the impression of having finished speaking. Filler words are also sometimes called filled pauses, hesitation markers, or planners. In American English, common filler sounds are ah, uh, and um. Among younger speakers, the fillers "like", "you know", "I mean", "okay", "so", "actually", "basically", and "right" may be prevalent.

"Speech-to-text converter" refers to logic to convert speech audio into textual content (words and sentences). Many commercial speech-to-text converters are available as are some open-source versions such as Carnegie Mellon University's CMU Sphinx and Kaldi. Through application of a natural language processor, grammar and sentence structure may also be analyzed. "Natural language processor" refers to logic to process and natural language data. A natural language is a language that has evolved naturally in humans through use and repetition without conscious planning or premeditation. Natural languages take different forms, such as speech or signing. They are distinguished from constructed and formal languages such as those used to program computers or to study logic.

Results from the video analyzer and audio analyzer are processed by a transformation module into performance vectors and subject to combinatorial logic to integrate the vectors with prior performance vectors and arrive at a multi-session rubric. The performance vectors and/or rubric may be provided to a decision module (component) for determination of pivot points in a conversation between the user and a bot agent. "Rubric" refers to an organized data set to promote the consistent application of learning expectations, learning objectives, or learning standards. The rubric is integrated by a recommendation module to compose a final report to the trainee. "Recommendation module" in this disclosure refers to logic generating suggested responses to features or behaviors identified in audio and video. Feedback from backpropagation logic is applied to the video analyzer and audio analyzer as a closed-loop control system to further refine the quality of recommendations.

FIG. 1 depicts user and administrative interfaces to a bot system 100 in accordance with one embodiment. A bot system 100 may manage a bot agent 102 or plurality of bot agents 102. Bot agents 102 may incorporate pivot logic 200, discussed in more detail with respect to FIG. 2. In some embodiments, the pivot logic 200 may be configured in a more universal location within the bot system 100, interacting with bot agents 102 and other bot system 100 components as needed. Bot agents 102 may be configured within a bot network 300, discussed in more detail with respect to FIG. 3. The bot system 100 may be configured with a multi-modal feedback generator 400, as is described in greater detail with respect to FIG. 4. The elements comprising the bot system 100, including bot agents 102, the pivot logic 200, the bot network 300, and the multi-modal feedback generator 400, may be located on one server, distributed across multiple servers, hosted upon cloud servers, and other configurations, as will be well understood by one of ordinary skill in the art.

A user 106 may interact with a bot system 100 via a programmatic interface 108 to a bot agent 102. The programmatic interface 108 may in one embodiment be an application stored on a desktop or mobile computing device accessed by the user. Manners of interaction may include inputs 110 such as video signal 122, audio signal 124, and text signal 126 relayed from the user 106 to the bot system 100 by the programmatic interface 108. Cameras, microphones, keyboards, touchscreens, and other peripherals associated with the programmatic interface 108 device or system may be manipulated by the user 106 to capture the inputs 110.

Each bot agent 102 may be configured with control settings 112 provided by a system administrator 114. Control settings 112 for a bot agent 102 may also be provided as feedback from other elements of the bot system 100. Examples of control settings 112 may include topic context, conversation context, conversation theme, preferred bot agent profile, defined conversation flow template, quantitative pivot rules, and qualitative pivot rules. Based on inputs 110 and control settings 112, the pivot logic 200 configured within the bot agent 102 and/or the bot system 100 may provide conversation pivot decision 120 data to other bot agents 102, which may be configured in the bot network 300.

In one embodiment, control settings 112 may be selected by the user 106, and/or may be adjusted based on the inputs 110 provided by the user 106 in the course of the conversation. This may allow the bot agent 102 to simulate a real-world scenario that the user 106 may encounter, allowing the user 106 to practice in that simulated environment. This may lead to more rapid and improved development of a user's communication skills.

The active bot agent 104 currently interacting with the user 106 may provide active bot feedback signals 116 generated by the pivot logic 200 to the user 106 via the programmatic interface 108 as user feedback 130. Active bot feedback signals 116 may include signals to encourage behavioral modifications by the user 106. In some embodiments, the bot system 100 may also provide multi-modal feedback signals 128 from the multi-modal feedback generator 400 to the user 106 via the programmatic interface 108 as user feedback 130.

Figure 2:
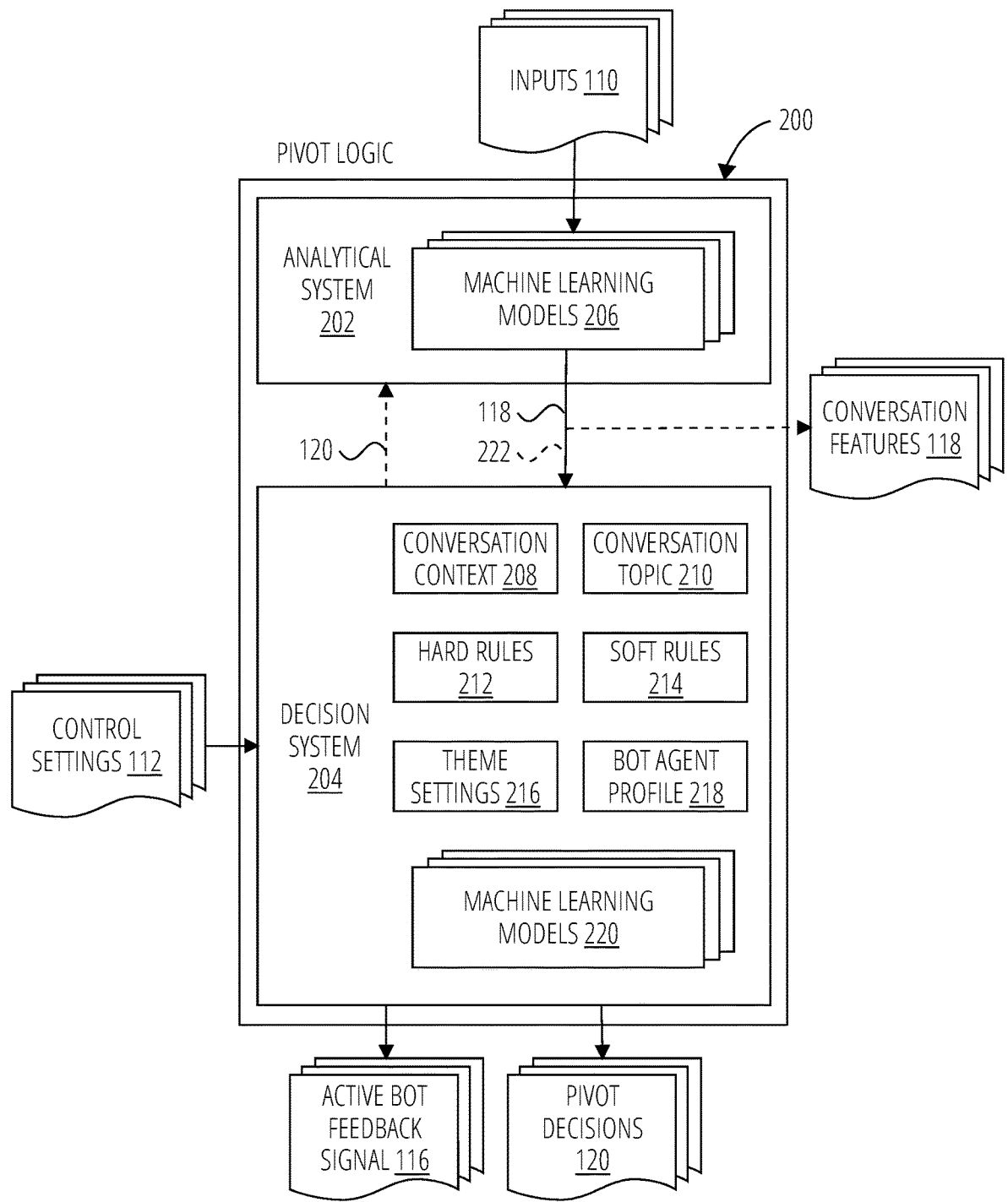
FIG. 2 depicts pivot logic 200 in accordance with one embodiment.

FIG. 2 depicts pivot logic 200 in accordance with one embodiment. The pivot logic 200 may comprise an analytical system 202 and a decision system 204. The pivot logic 200 may be incorporated into the bot agent 102 that is currently activated to interact with the user 106. Alternatively, the pivot logic 200 may be distinct from the bot agent 102, so that it may be invoked and utilized as a more centralized function or service by multiple bot agents 102, such as those in a bot network 300.

The machine learning models 206 of the analytical system 202 may transform inputs 110 such as text signal, audio, and video from the user 106 into conversation features 118 that may be sent to a decision system 204. Conversation features may comprise human speech features and human morphology features, as discussed in greater detail with regard to FIG. 5. Conversation features 118 and may be structured as input vectors 222 to the decision system 204. The conversation features 118 may include values representing the emotional state of the user 106, such as passionate, calm, engaged, enthusiastic, and confident. The conversation features 118 may also include values indicative of the nature of the inputs from the user 106, such as descriptive, informative, explanative, and propriate. The conversation features 118 may also include values representing various other characteristics of the inputs from the user 106, such as conversation context, intention, depth of understanding of the conversation topics, and any objects, things, or entities identifiable from the inputs. In one embodiment, the conversation features 118 may be provided to additional components of the bot system 100, such as the multi-modal feedback generator 400.

The decision system 204 may utilize the conversation features 118 and configured values for the conversation context 208 and conversation topic 210 to generate a conversation pivot decision 120 (topical change). Control settings 112 may be used to configure values for the conversation context 208 and conversation topic 210. Active bot feedback signal 116 in response to the inputs 110 may also be provided. If no conversation pivot decision 120 was made, the active bot feedback signal 116 may represent a reaction to the inputs 110 consistent with the currently identified topic. If a conversation pivot decision 120 was made, the active bot feedback signal 116 may indicate to the user that the most recent inputs 110 (e.g., question) is acknowledged. A different bot agent 102 may be selected based on the pivot topic and may then respond to the user with more substantive information. In one embodiment, conversation pivot decisions 120 may be backpropagated to the analytical system 202. In this manner, the conversation pivot decisions 120 may be applied by backpropagation logic in a closed-loop technique to a video analyzer and an audio analyzer, which are described in greater detail with respect to FIG. 5 and FIG. 6.

The conversation pivot decision 120 may be further guided by preconfigured hard rules 212, soft rules 214, and theme settings 216 for the conversation flow. "Hard rules" are rules that a change in topic must conform to in order to remain consistent with a preconfigured conversation flow. "Soft rules" are guidelines but are not required to be followed. Theme settings 216 and a bot agent profile 218 may help maintain a sense of conversation consistency for the user as the conversation pivots. In other words, the bot agent to service the conversation after a pivot may utilize the theme settings 216 and bot agent profile 218 so as to "sound" or "feel" like the previous bot agents in the conversation flow.

Figure 4:
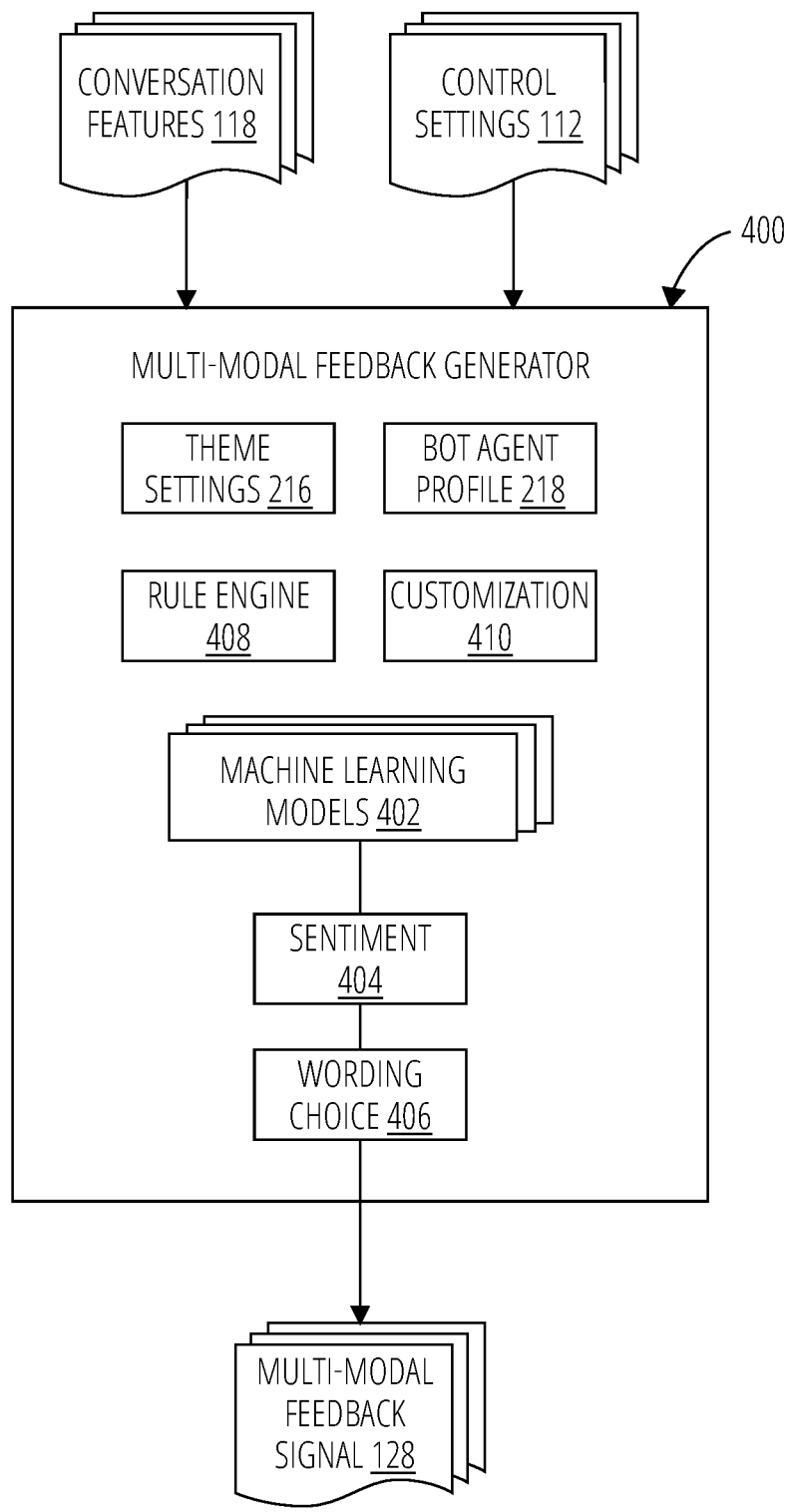
FIG. 4 depicts a multi-modal feedback generator 400 in accordance with one embodiment.

The machine learning models 220 of the decision system 204 may transform the conversation features 118 and control settings 112 into active bot feedback signal 116 to the user 106 and a conversation pivot decision 120 (or a determination that no pivot should occur at this point in the conversation). In one embodiment the machine learning models 220 may comprise two machine learning models one to determine the conversation pivot decision 120 (or not), and the other to generate the active bot feedback signal 116 to the user 106. Other embodiments may utilize more than one machine learning model to operate on different sets of inputs, and then one or more additional models (or heuristic logic) to combine/reconcile the outputs of the multiple machine learning models 220 into a conversation pivot decision 120 and/or active bot feedback signal 116 to the user 106. In one embodiment, at least one machine learning model is utilized in the decision system 204 to determine the manner of presenting the feedback to the user 106 as text, audio, or facial expressions of an avatar, for example. A more detailed example of the logic for feedback determination is depicted in FIG. 4.

Figure 3:
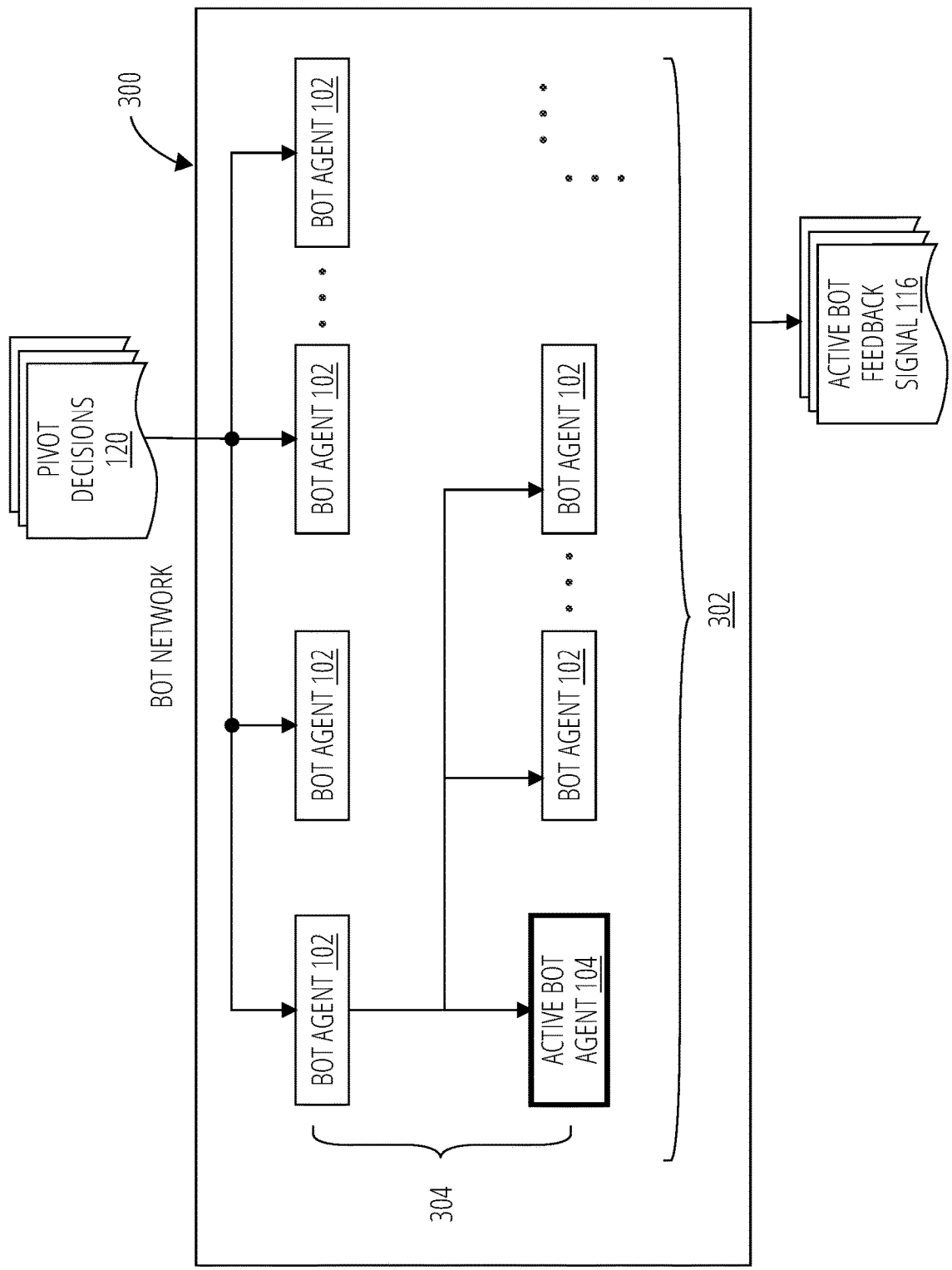
FIG. 3 depicts a bot network 300 in accordance with one embodiment.

FIG. 3 depicts a bot network 300 comprising a plurality of bot agents 302 in accordance with one embodiment. Bot agents 102 may be specialized to interact with the user 106 on specific topics, and one bot agent 102 may hand user interaction off to a new bot agent 102 when a pivot in the conversation is detected. The handoff may appear seamless from the perspective of the user 106. A tree structure 304 of bot agents 102 may be formed to follow a conversation flow.

A simple example of a conversation pivot decision 120 leading to a handoff is when a conversation with the user is initiated. A conversational bot agent 102 may be instantiated and connected to the conversation, and this initial bot agent 102 may be specialized to provide greetings. Once the greeting is made, the user 106 may ask a question (e.g., via typed text or audio) and the pivot logic 200 may recognize a change in topic away from the "greeting" topic that begins each conversation by default. The conversation pivot decision 120 may result in selection of a new bot agent 102 to service the conversation based on a closest match between the bot agent's configured topics of support, and a topic identified (e.g., via a machine learning model trained to classify inputs into topics) from the user's questions.

The conversation pivot decisions 120 may be guided by a pre-configured "storyline" that defines a direction of the conversation through various topics, from greeting to conclusion. The story line may be utilized to keep the user "on topic" and prevent conversations from veering far from an intended purpose of the conversation. The conversation flow between a user 106 and a bot agent 102 may thus proceed, with the bot agent 102 providing feedback to keep the conversation on topic, until the system recognizes a pivot point that conforms to the pre-configured story line, at which time a more suitable bot agent 102 for the change in topic may be selected and placed in control.

FIG. 4 depicts a multi-modal feedback generator 400 in accordance with one embodiment. The multi-modal feedback generator 400 may determine both the content and manner of active bot feedback signal 116 to the user 106. The multi-modal feedback generator 400 may utilize one or more machine learning models 402 to transform conversation features 118 and control settings 112, into a sentiment 404 and wording choice 406 (or visual expression choice) further influenced, for example, by a bot agent profile 218, theme settings 216, a rule engine 408, and customizations 410. Multi-modal feedback signal 128 based on or comprising the sentiment 404 and wording choice 406 may be output from the multi-modal feedback generator 400.

Figure 5:
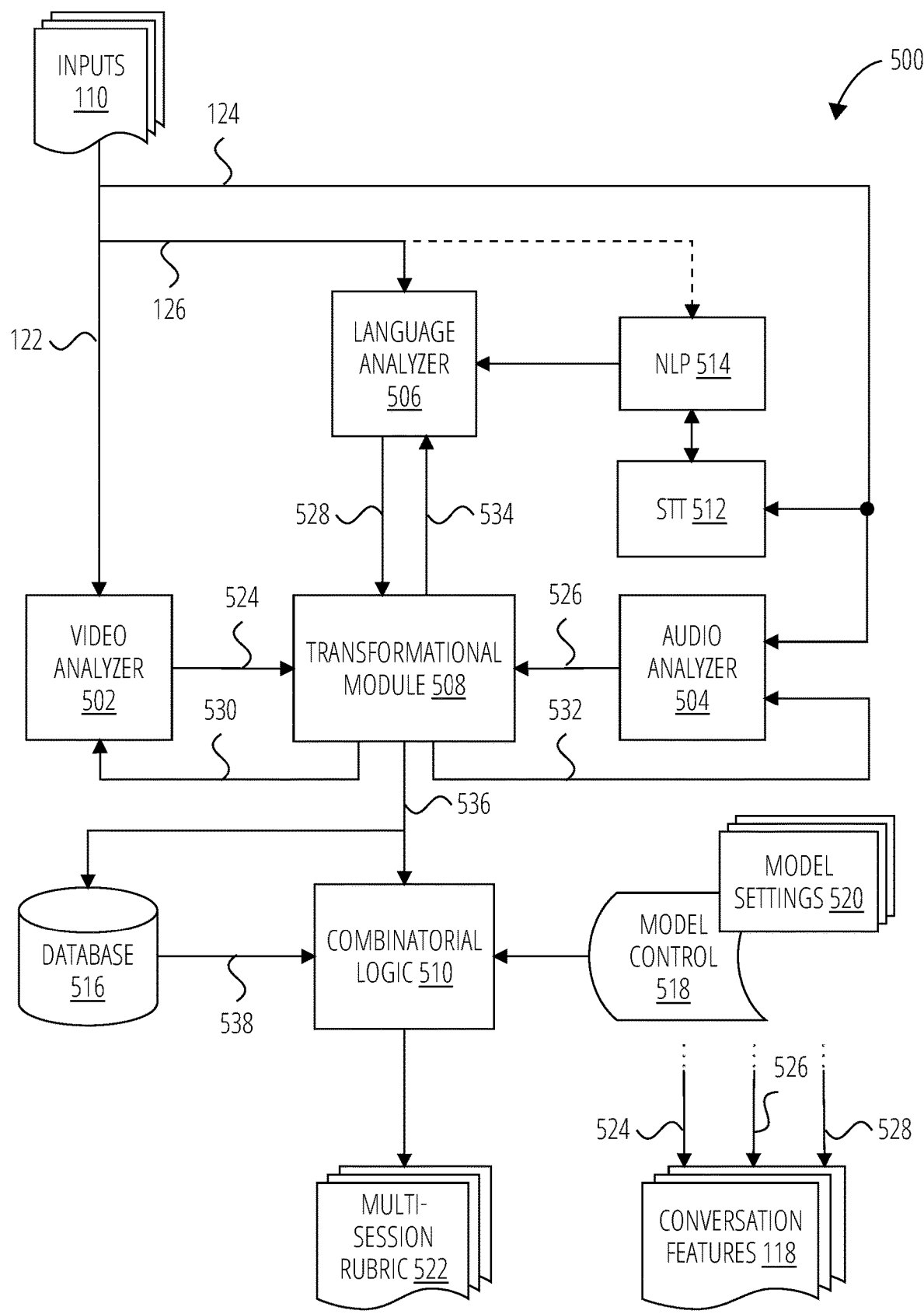
FIG. 5 depicts an interactive analytical system 500 in accordance with one embodiment.

FIG. 5 depicts an embodiment of an interactive analytical system 500. The analytical system 202 illustrated in FIG. 2 may implement such a system. An example of such a system is disclosed in U.S. Pat. No. 11,010,645, titled Interactive Artificial Intelligence Analytical System, issued May 18, 2021, the content of which is incorporated by reference herein in its entirety.

The interactive analytical system 500 may comprise a video analyzer 502, an audio analyzer 504, a language analyzer 506, all providing data to a transformational module 508 which outputs data to combinatorial logic 510. The video analyzer 502, audio analyzer 504, and language analyzer 506 may comprise one or more machine learning models. These may correspond in some embodiments to the machine learning models 206 described with respect to FIG. 2. The interactive analytical system 500 may further comprise a speech-to-text converter 512, a natural language processor 514, a database 516, model control 518, and model settings 520. The interactive analytical system 500 may take in inputs 110 in the form of video signal 122, audio signal 124, and text signal 126 captured by the programmatic interface 108 of the bot agent 102 and may transform, combine, and analyze this data to create a multi-session rubric 522.

The video analyzer 502 may include a module such as a video decoder that may produce a time-ordered sequence of video frames as an intermediate output. Such an output may include various features subject to analysis in the subsequent modules, e.g., body gestures and facial expressions, to provide evaluation on respective skills. The video signal 122 signal may be captured either in real time or from a recording by the video analyzer 502. The video analyzer 502 may process the video frames of the video signal 122 signal, individually and in time-ordered sequence, to convert the video signal into visual features 524 such as a plurality of human morphology feature predictions, e.g., eye contact, expression, movement, gestures, and so on. Human body and hand locations and gestures may also be detected per frame or group of frames, and those key points across all frames may be used to construct the action trajectories of body (and hands) which may be subject to later analysis.

A facial analysis module may be used to detect faces and corresponding facial landmark points in the video frames and to extract facial features, which may be used to yield analytical outputs such as gaze direction and micro-expressions. "Micro-expression" refers to an involuntary facial display of emotion that lasts for a fraction of a second, sometimes as little as $\frac{1}{25}$th of a second. The person who has expressed a micro-expression may not be aware that they have displayed an emotion through the micro-expression and may even wish to conceal the emotion. When combined later into category scores using combinatorial logic 510, emotion analysis, such as anger, hesitation, passion, nervousness/confidence, and energy level may be predicted. "Category score" refers to a value resulting from a transformation of a feature vector into a scalar based on category-specific combinatorial logic. Those skilled in the art will appreciate that the human morphology features may include any other trainee features detectable with a camera, such as iris dilation, dressing etiquette, and so on. The visual features 524 or morphology features from the converted video signal may serve as inputs to a transformational module 508.

The audio signal 124, which may accompany the video signal 122 signal or may be captured where no video input is detected, may undergo a different processing path before reaching the transformational module 508. A speech rate analysis may be performed by the audio analyzer 504 to determine speech rate and flow. Proper speech rate and flow may also be related to the topic, context, and target audience. Audio signal 124 may be converted to text via a conventional speech-to-text converter 512. The output of the speech-to-text converter 512 may be applied to determine articulation. An articulation metric may be generated based on the confidence of the analytical results of user's enunciation of words. The use of accents (e.g., different pronunciations in different contexts) may be supported in this module.

Various analyses may be performed on the speech-to-text converter 512 output. A filter may be applied to the text output to generate a filler words analysis. Conventional speech-to-text converter 512 applications may delete filler words from their textual output. However, in the disclosed system an audio signal 124 waveform may be retained and compared to the speech-to-text converter 512 output for the purpose of capturing said filler words. A word diversity analysis may also be performed on the text output to identify the trainee's choice of words. Finally, a similar content understanding analysis may be performed on the text output to identify speech content and structure. An embedded linguistic module may also be included to support the analysis of the structure and content of the user's delivery. Those skilled in the art will appreciate that other analysis may be performed on the audio signal 124 signal, such as detection of tone, pitch, quaver, etc. Respiration rate and other such information may also be determined from the audio signal 124 data.

The text output from the speech-to-text converter 512 may then be used as input to a natural language processor 514. The natural language processor 514 may modify the text output from the speech-to-text converter 512, replacing filler words where appropriate, and otherwise creating data suitable for processing by the language analyzer 506 using techniques well understood in the art for natural language processing. A grammar analysis may additionally be applied by the language analyzer 506 to determine grammatical errors. Current grammatical suggestions may be given based on the user's topic, context, and target audience. A linguistic dictionary may be embedded in the language analyzer 506 to understand and evaluate the user's topic, intentions, and whether the user delivers the content properly by choosing optimal words. A similar content understanding analysis may be performed by the language analyzer 506 to identify speech content and structure. Speech features 528 such as grammar and sentence structure may be extracted by the language analyzer 506. These speech features 528 and other audio features 526 may be suitable as inputs to the transformational module 508.

In one embodiment, inputs 110 may include text signal 126. The text signal 126 may be input to the language analyzer 506, similar to the output of the natural language processor 514. In another embodiment, the text signal 126 may be input to the natural language processor 514 as described for output from the speech-to-text converter 512. Natural language processor 514 output generated from text signal 126 may be similarly sent to the language analyzer 506 to detect speech features 528 for input to the transformational module 508, as previously described.

The transformational module 508 may process visual features 524 (morphology features) received from the video analyzer 502, audio features 526 from the audio analyzer 504, and speech features 528 from the language analyzer 506 to transform these features into a current multi-dimensional performance vector. The current multi-dimensional performance vector from the transformational module 508 may act as feedback input to the video analyzer 502, the audio analyzer 504, and the language analyzer 506, in the form of video performance vector feedback 530, audio performance vector feedback 532, and speech performance vector feedback 534, respectively. The transformational module 508 may send a current multi-feature performance vector 536 to a combiner applying combinatorial logic 510. Output current multi-feature performance vectors 536 from the transformational module 508 may additionally be sent to a database 516 where they may be additionally applied as prior multi-feature performance vector 538 inputs to the combinatorial logic 510. Additional details on one embodiment of inputs to the transformational module 508 from the video analyzer 502, audio analyzer 504, and language analyzer 506, and feedback to these components, are provided with respect to FIG. 6.

The combinatorial logic 510 may receive a current multi-dimensional performance vector (the current multi-feature performance vector 536) from the transformational module 508 along with an optional model control 518 and prior multi-feature performance vectors 538 from the database 516, which may include relevant data derived from a subject's biological information, e.g., pulse, respiration, blood pressure, skin conductivity, etc. "Model control" refers to logic to control the behavior of combinatorial logic based on a model control setting. A model control setting is a configuration setting associated with a particular behavioral model, such as "sales pitch", "management training", "interviewing" and so forth. The model control 518 may additionally control the combinatorial logic 510 under guidance from model settings 520. The combinatorial logic 510 may then integrate the current multi-feature performance vector 536 and one or more prior multi-dimensional performance vectors (received as prior multi-feature performance vectors 538 in one embodiment) to generate a multi-session rubric 522.

The combinatorial logic 510 may comprise both supervised learning and unsupervised learning. "Supervised learning" refers to an algorithm that maps an input to an output based on example input-output pairs. A supervised learning algorithm infers a mapping from labeled training data consisting of a set of training examples. In supervised learning, each sample is a pair comprising an input (typically a vector) and a desired output value (also called the supervisory signal). A supervised learning algorithm analyzes the training data and produces an inferred function, which may be used for mapping new (non-training) inputs to classes or predictions. "Unsupervised learning" refers to a class of self-organized Hebbian learning algorithms that identify patterns in data set without pre-existing labels. Semi-supervised learning is a class of algorithms implementing a hybridization of supervised and unsupervised techniques. Two of the main techniques used in unsupervised learning are principal component analysis and cluster analysis.

Supervised learning may comprise a three-step process of labeling, score learning, and learning to transform audio, video, typed text, and other content features into multi-dimensional scores. Data labeling may begin with communication professionals labeling existing videos on a 1-10 scale in 6 dimensions, including enthusiasm, engagement, articulation, pace, proper content, proper facial expression, and eye contact. Criteria standards may be provided to the labeling professionals to ensure consistency. Averages and standard deviations may be gathered from each professional and their outputs may then be normalized. Each video may also be labeled with an overall score in addition to the dimension scores. For score learning, a machine learning algorithm (typically a support vector machine) may be used to learn a set of weights of 6-dimensional features to predict an overall score that minimizes the differences between human-labeled overall scores. This model may be used later to predict the overall score and provide it to the user. For learning to transform audio, video, typed text, and content features to multi-dimensional scores, related audio, video, and speech content may first be selected as feature sources for each of the 6 dimensions as follows: enthusiasm features pitch signal, text embedding, words per second, number of expression changes; articulation features language model output, canny edge output, wave Fourier transform output, mel-frequency cepstral coefficient (MFCC) output; confidence features all other raw outputs; content features language model output, word2vec, number of filler words, number of transitions, number of emotional words; facial features landmarks of facial points, number of happiness, number of sadness; and eye contact features eye ball trajectory. A machine learning model (support vector machine) may be trained for each dimension to predict the manually labeled score in the data labeling phase above.

Unsupervised learning may comprise five steps. First, videos may be categorized based on their contexts (job interview, sale pitch, etc.). Videos may then be clustered by use of a K-Means algorithm on a 1-10 scale using raw features. Features may be chosen that differentiate videos similarly to human rankings. The identified features set may then be used to train a new K-means model and predict a score as reference. Finally, the video may be manually reviewed if it has significantly differing scores between supervised learning and unsupervised learning.

All scoring methods may be on a 1-10 scale for consistency. For features such as pace, pause, filler words, on so on, scores may be based on expert knowledge with an ideal 10/10 standard conforming to industry standards such as: ideal speech rate at 120-140 words per minute; 0-1 filler words per minute; and considering the ideal speech rate, an average length of a sentence (12 words), an ideal pause rate at 8-10 pauses per minute, with an effective pause at 0.5-2 seconds long, depending on intention. Pauses may alternatively be evaluated through a combination of knowledge and supervised learning since pauses may be expected to appear at the end of a sentence or phrase, rather than as a break within them. At the other end of the scale, the zero (0) thresholds may include: a speech rate below 60 or above 200 and fewer than two pauses or extra long pauses (i.e., longer than 5 seconds) in a given minute. Scoring from 1-9 may then be scaled based on the minimum (0) and maximum (10) values.

Figure 6:
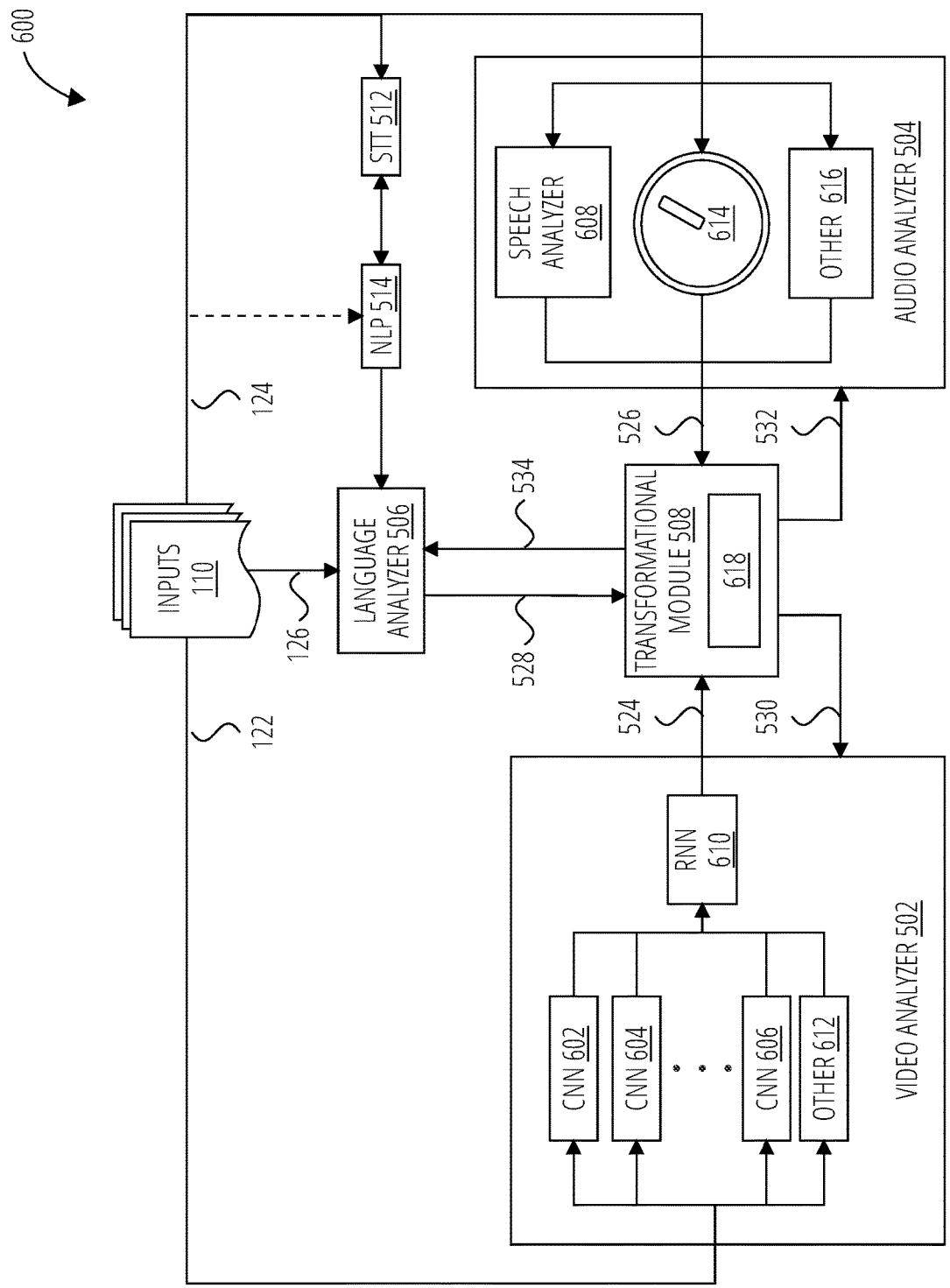
FIG. 6 depicts transformational module interfaces 600 in accordance with one embodiment.

FIG. 6 depicts exemplary transformational module interfaces 600 for processing operations within the video analyzer 502 and audio analyzer 504 and their respective feedback loops to the transformational module 508. Referring first to the video analyzer 502, the input video feed, comprising individual video frames and time-ordered sequences of video frames, may act as inputs to a set of neural networks (e.g., convolutional neural networks 602, convolutional neural network 604, convolutional neural network 606 and additional or intervening neural networks). "Convolutional neural network" or "CNN" refers to a class of deep neural networks applied to analyzing images and video. CNNs utilize convolution filters within the featuring layers of the neural network in order to respond to progressively more abstract features of images or video. Each frame may be applied in parallel to the convolutional neural networks to extract key point features at time or frame interval t. (Not every frame may be applied; some may be skipped.)

Convolutional neural network (CNN) is a deep learning model which outperforms many other models in learning global features of an image and classifying those features into several categories. Unlike conventional computer vision, a CNN-like network model may be gradually tuned to store the global features of a given image to mimic how human visual perception works.

Image classification is the task of taking an input image and outputting a class (a cat, dog, etc.) or a probability of classes that best describes the image. CNNs are particularly well suited to classifying features in data sets modeled in two or three dimensions. This makes CNNs popular for image classification, because images may be represented in computer memories in three dimensions (two dimensions for width and height, and a third dimension for pixel features like color components and intensity). For example a color JPEG image of size 480×480 pixels may be modeled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.). Fundamentally, CNNs input the data set, pass it through a series of convolutional transformations, nonlinear activation functions, such as Rectified Linear Units (RELU), and pooling operations (downsampling, e.g., maxpool), and an output layer (e.g., Softmax) to generate the classifications.

Each neural network may be trained to detect different types of features in the frame. For example, at least one of the neural networks may implement a gaze detector. "Gaze detector" refers to logic to determine the direction of a person's gaze. This is typically accomplished by analyzing the eyes for the orientation of the pupils. A gaze detector may be implemented by a video analyzer configured to recognize eye features, or by reflecting light off the eyes and measuring the angle of reflection or absorption.

Although the depicted embodiment may use neural network classifiers, other types of classifiers may also be utilized, such as random forest and support vector machine algorithms, for example. "Random forest" refers to an ensemble learning algorithm for classification, regression and other tasks that operates by constructing a multitude of decision trees at training time and outputting the class that is the mode of the classes (classification) or mean prediction (regression) of the individual trees. Random decision forests correct for decision trees' tendency toward overfitting to their training set. "Overfitting" refers to a configuration state in which the weights and other parameters of a neural network are so closely fitted to the training data set that the neural network performs poorly at more generalizing to correctly classify features in non-training set inputs.

Time-ordered sequences of features extracted from the frames by the convolutional neural networks 602 through 606 may be applied to recurrent neural network 610, which integrates outputs of the convolutional neural networks and analyzes them for temporal features. "Recurrent neural network" refers to a class of neural network in which connections between nodes form a directed graph along a temporal or otherwise ordered sequence to enable the classification of temporal dynamic behavior. The term 'recurrent neural network' may be abbreviated as RNN. RNNs maintain an internal state that acts as memory of prior and/or subsequent samples in a sequence. For example, the recurrent neural network 610 may integrate features from t=1 to t=T and output predictions of human morphology based on the evolution of the features in time. Other analysis algorithms 612 (e.g., known motion vector analysis algorithms, color analysis, etc.) may also provide inputs to the recurrent neural network 610 before the visual features are input to the transformational module 508. In some implementations, some or all of the outputs of the convolutional neural networks 602 through 606 and other analysis algorithms 612 may be applied directly to the transformational module 508 without being integrated by the recurrent neural network 610.

Referring to the audio analyzer 504, modules used in the analysis of audio waveforms are illustrated and may be leveraged in additional to the speech-to-text converter 512, natural language processor 514 and language analyzer 506 to generate audio feature inputs to the transformational module 508. Upon receiving the audio separated from the video input, the audio analyzer 504 may utilize a timebase 614 (effectively, a clock) to detect pronunciation clarity. "Timebase" refers to a periodic signal providing a reference clock for events or features in audio or video content.

Other audio analysis 616 may also be leveraged to create an audio waveform subject to a speech analyzer 608 (e.g., the collaborative voice analysis repository or COVAREP, https://gitbub.com/covare/ovarep), which may integrate these inputs, normalized to prevent bias, to create a representation of tonal variance, an enunciation metric, an articulation metric, the timebase, a vocal pacing metric, and a representation of filler words. The transformational module 508 may additionally receive speech features 528 such as grammar and sentence structure metrics from the language analyzer 506.

The transformational module 508 may integrate the visual features 524, the audio features 526 output from the audio analyzer 504, and speech features 528 from the language analyzer 506 to generate multi-dimensional performance vectors. These performance vectors may be applied by backpropagation logic 618 in a closed-loop fashion to train the video analyzer 502, the audio analyzer 504, and the language analyzer 506, in the form of video performance vector feedback 530, audio performance vector feedback 532, and speech performance vector feedback 534, respectively. "Backpropagation" refers to an algorithm used in neural networks to calculate a gradient for updating the weights in the neural network. Backpropagation algorithms are commonly used to train neural networks. In backpropagation, a loss function calculates a difference between the actual outputs of the neural network and expected outputs of the neural network. "Weights" refers to values with which activations are multiplied to increase or decrease the impact of the activation values in an activation function. "Loss function," also referred to as the cost function or error function (not to be confused with the Gauss error function), refers in this disclosure to a function that maps values of one or more variables onto a real number intuitively representing some "cost" associated with those values. Conversation pivot decisions 120 may also be applied by backpropagation logic in a closed-loop technique to the video analyzer 502 and audio analyzer 504. In one embodiment, the conversation pivot decisions 120 may also be backpropagated to the language analyzer 506 in a similar manner.

A table showing a correlation between performance vectors output by the transformational module 508 and a corresponding multi-session rubric 522 for a job interview is depicted below. The rubric may take the form of a Situation Task Action Result (STAR) generated for a particular segment of a job interview, for example when a user is asked to respond to: "Tell me about a time when you led a project."

An overall total score for the user may be generated as the average value of all output metrics. Feedback on a specific metric/subcategory may be formulated from a combination of the overall score and the user's timeline-based output values of the specific metric. Take, for example, the enthusiasm metric. "Enthusiasm metric" refers to a value indicative of a level of enthusiasm conveyed by a person. An enthusiasm metric may be generated using combinatorial logic on a variety of inputs such as emotion, tone, pacing, and other factors. This metric may track how this user's enthusiasm level changes throughout the entire course of the presentation (video length). A final score for this metric may be determined as an indication of how well the enthusiasm trajectory/allocation fits a best model. Specifically, for certain types of presentations, e.g., sales or training, one may wish to be more enthusiastic at the beginning and end of the presentation to draw attention from the audience. Thus, the actual metric values and the arrangement and fluctuation of the metric values over the course of the presentation may be utilized and compared with the ideal (e.g., 10/10 standard) best model, and personalized feedback may be generated by identifying behaviors associated (e.g., in a database) with bridging the gap between the user's performance metrics and the 10/10 standard—best model.

In the following tables, the metrics in the All Output column may be identified as follows:
O1—body language
O2—eye contact
O3—smiling
O4—anger
O5—hesitation
O6—passion
O7—composure
O8—energy level
O9—articulation
O10—filler words
O11—speech rate
O12—flow
O13—grammar
O14—choice of words
O15—structure
O16—content More or fewer metrics may be utilized as needed/useful in particular embodiments.

TABLE 1

Presentation Performance

| Rubric Category | Sub-Category | All Output |
|---|---|---|
| Passion | Show enthusiasm and vary your emotional tone | O4 O5 O6 |
| | Project and modulate the voice | O8 |
| | Use open gestures | O1 |
| | Demonstrate proper facial expressions | O3 |
| | Be confident and show no nervousness | O7 |
| Content | Answer key audience questions regarding the topic | O16 |
| | Provide quantitative and qualitative support | O16 |
| | Use storytelling effectively | O16 |
| | Limit main points to three or four | O15 |
| | Use transitions and summaries | O15 |
| | Have a clear introduction and conclusion | O16 |
| Engagement | Maintain eye contact | O2 |
| | Avoid filler words and "double clutching" | O10 |
| | Speak at a proper pace | O11 |
| | Pronounce words clearly | O9 |
| | Speak with a pleasant flow | O12 |

TABLE 2

Job Interview Performance

| Rubric Category | Sub-Category | All Output |
|---|---|---|
| Passion | Show enthusiasm and vary your emotional tone | O4 O5 O6 |
| | Project and modulate the voice | O8 |
| | Use open gestures | O1 |
| | Demonstrate proper facial expressions | O3 |
| | Be confident and show no nervousness | O7 |
| Content | Allocate the content in a good logical structure | O15 |
| | Quantify the results and benefits you achieved | O16 |
| | Give direct, specific, and complete answers—avoid banalities | O16 |
| | Be diplomatic—avoid criticizing anyone, even yourself | O16 |
| | Show knowledge and insights in your answers | O16 |
| | Explain how your skills satisfy the job's requirements—connect the dots | O16 |
| Engagement | Maintain eye contact | O2 |
| | Dress appropriately for the industry and position | Computer vision, computing flow same as O1 |
| | Avoid filler words and "double clutching" | O10 |
| | Speak at a proper pace | O11 |
| | Pronounce words clearly | O9 |
| | Speak with a pleasant flow | O12 |

After processing, a composite rubric in the form of a report may be generated for one session or as part of a coached training regime (multiple sessions for an individual or across a group). A sample report is depicted in the table below.

TABLE 3

Sample Report

| Rubric Category | Sub-Category | Sample Score | Sample Feedback |
|---|---|---|---|
| Passion | Show your enthusiasm and vary your emotional tone | 2 | Force yourself to smile or frown during rehearsal |
| | Project and modulate the voice | 4 | During rehearsal, identify three additional sections that need vocal stress to differentiate them from other passages |
| | Use open gestures | 3 | During rehearsal, increase your open gestures by 50% as compared to other presentations |
| | Demonstrate proper facial expressions | 5 | Imagine that the audience needs your facial expressions to fully understand your message |
| | Be confident and show no nervousness | 6 | In rehearsal, make sure you stand erect with shoulders back when presenting |
| Content | Answer key audience questions regarding the topic | 7 | Make sure you adequately answer all key audience questions |
| | Provide quantitative and qualitative support | 9 | Ensure that you are defining key terms |
| | Use storytelling effectively | 10 | Ensure that you are also using effective quantitative support for your key points |
| | Limit main points to three or four | 5 | Evaluate the clarity of the overall structure of your presentation |
| | Use transitions and summaries | 7 | Increase your transitions between main points by 10-15% |
| | Have a clear introduction and conclusion | 8 | Focus on an attention-grabber and initial summary in the introduction |
| Engagement | Maintain eye contact | 6 | Ensure that you establish eye contact with all members/sections of your audience |
| | Avoid filler words and "double clutching" | 3 | Get comfortable with brief moments of silence rather than vocalized pauses |
| | Speak at a proper pace | 4 | In rehearsal, randomly vary your speaking rate, above and below 120 words per minute |
| | Pronounce words clearly | 7 | Use simple and familiar words in your presentation |
| | Speak with a pleasant flow | 4 | Use pauses properly to emphasize your key points |

Figure 7:
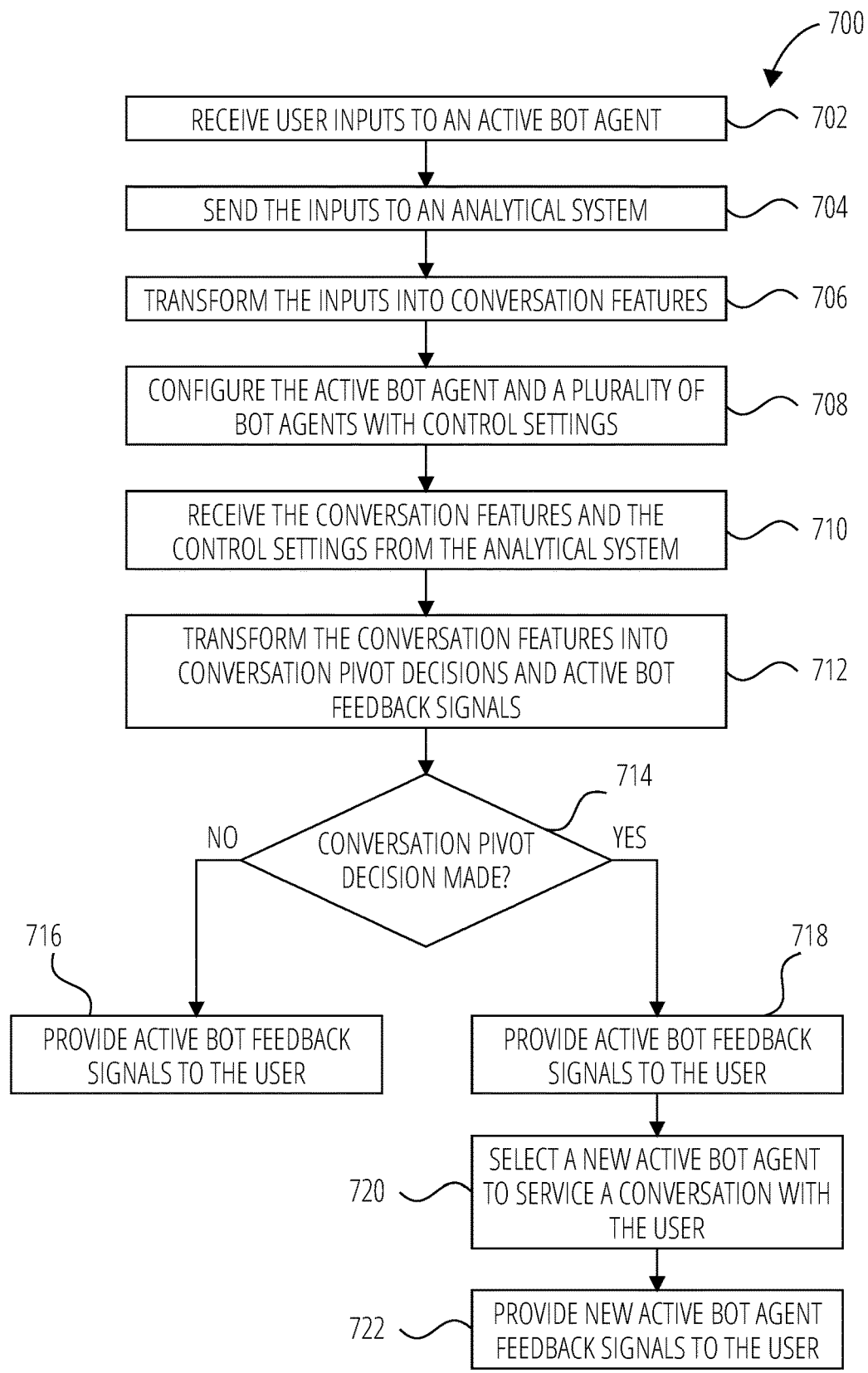
FIG. 7 illustrates a routine 700 in accordance with one embodiment.

FIG. 7 illustrates an example routine 700 by which a bot system such as that introduced in FIG. 1 may implement the method disclosed herein. According to some examples, the method includes receiving user inputs to an active bot agent at block 702. The inputs may include video signals captured by a camera or other image capture device, audio signals captured by a microphone or other audio capture device, and text signals captured from a keyboard, touchscreen selection, or similar peripheral device supporting user entry of written text.

According to some examples, the method includes sending the inputs to an analytical system at block 704. For example, the bot agent 102 illustrated in FIG. 1 may send the inputs to an analytical system. The analytical system may reside within the active bot agent or may reside in a different portion of a larger system, that portion being in communication with the active bot agent.

According to some examples, the method includes transforming the inputs into conversation features at block 706. For example, the analytical system 202 illustrated in FIG. 2 may transform the inputs into conversation features. The analytical system may perform this transformation through the use of video, audio, and language analyzers, which may employ machine learning models. Video signals may be converted into a plurality of human morphology features using a video analyzer. Audio signals may be converted into a plurality of conversation features with an audio analyzer. Supervised and unsupervised machine learning models may be utilized to transform the human morphology features and the conversation features into performance metrics for passion, content, and engagement in a current multi-feature performance vector. Combinatorial logic may be used to generate an integration of the current multi-feature performance vector and one or more prior multi-feature performance vectors. One of a plurality of behavioral models may be configured as a scoring control on the combinatorial logic such that scores generated for the integration in a multi-session rubric by the combinatorial logic vary according to the behavioral features against model configured as a scoring control for combinatorial logic. The multi-session rubric may comprise a plurality of second-level performance scores grouped within top-level categories of passion, content, and engagement. The conversation features may be input vectors including at least one of values representing an emotional state of the user, values indicative of the nature of the inputs from the user, and values representing various other characteristics of the inputs from the user. The values representing the emotional state of the user may include at least one of passionate, calm, engaged, enthusiastic, and confident. The values indicative of the nature of the inputs from the user may include at least one of descriptive, informative, explanative, and propriate. The values representing various other characteristics of the inputs from the user may include at least one of conversation context, intention, depth of understanding of the conversation topics, and any objects, things, or entities identifiable from the inputs. In one embodiment, a multi-modal feedback generator may be operated to determine content of feedback signals and manner of feedback signals to the user. The multi-modal feedback generator may include at least one multi-modal feedback machine learning module to transform the input vectors and the control settings into a sentiment and at least one of a wording choice and visual expression choice. The at least one multi-modal feedback machine learning module may be further influenced by at least one of a bot agent profile, theme settings, a rule engine, and customizations.

Customizations may include topic context, conversation context, and/or a defined conversation flow template. Topic context may be customized by the user to reflect a topic interview, topic product pitch, or any topic of the user's choice. The user may customize the conversation context to reflect an initial conversation, a second conversation, a follow-up call, a final conversation, etc. The user may provide their own conversation flow template based on their needs and what they hope to accomplish through their interaction with the bot system.

According to some examples, the method includes configuring the active bot agent and a plurality of bot agents with control settings at block 708. For example, the system administrator 114 illustrated in FIG. 1 may configure the active bot agent and a plurality of bot agents with control settings. The control settings may include topic context, conversation context, a conversation theme, a preferred bot agent profile, a defined conversation flow template, quantitative pivot rules, qualitative pivot rules, and combinations thereof. Each of the plurality of bot agents may be associated with one or more topics through configuration with these control settings.

According to some examples, the method includes receiving the conversation features and the control settings from the analytical system at block 710. For example, the decision system 204 illustrated in FIG. 2 may receive the conversation features and control settings from the analytical system. According to some examples, the method includes transforming the conversation features into conversation pivot decisions and active bot feedback signals at block 712. For example, the decision system 204 illustrated in FIG. 2 may transform the conversation features into conversation pivot decisions and active bot feedback signals. The decision system may perform this using at least one machine learning module. The at least one machine learning module may comprise two machine learning modules. The machine learning modules may be a first machine learning module to determine the conversation pivot decision and a second machine learning module to generate the active bot feedback signals to the user. Transforming the conversation features into conversation pivot decisions may be guided by a preconfigured conversation flow including at least one of hard rules, soft rules, theme settings, and a bot agent profile. At least one of the multi-session rubric, current multi-feature performance vector and one or more prior multi-feature performance vectors may be applied to the decision system for determination of conversation pivot decisions in the conversation between the user and the active bot agent. The conversation pivot decision may be applied by backpropagation logic in a closed-loop technique to the video analyzer and the audio analyzer of the analytical system.

According to some examples, on condition that no conversation pivot decision is made at decision block 714, the method includes providing active bot feedback signals to the user at block 716. For example, the active bot agent 104 illustrated in FIG. 1 may provide active bot feedback signals to the user. This active bot feedback signal may represent a reaction to the user input that is consistent with a currently identified topic.

According to some examples, on condition that a conversation pivot decision is made at decision block 714, the method includes providing active bot feedback signals to the user at block 718. For example, the active bot agent 104 illustrated in FIG. 1 may provide active bot feedback signals to the user. These active bot feedback signals may represent a reaction to the user input that is not consistent with the currently identified topic.

According to some examples, the method includes selecting a new active bot agent to service a conversation with the user at block 720. For example, the bot system 100 illustrated in FIG. 1 may select a new active bot agent to service a conversation with the user. The new active bot agent may be selected by applying the conversation pivot decision. The new active bot agent may be selected from the plurality of bot agents.

According to some examples, the method includes providing new active bot agent feedback signals to the user at block 722. Although the example routine 700 depicts a particular sequence of operations, the sequence may be altered without departing from the scope of the present disclosure. For example, some of the operations depicted may be performed in parallel or in a different sequence that does not materially affect the function of the routine 700. In other examples, different components of an example device or system that implements the routine 700 may perform functions at substantially the same time or in a specific sequence.

The systems disclosed herein, or particular components thereof, may in some embodiments be implemented as software executed on one or more devices. By way of example, components of the disclosed systems may be implemented as an application, an app, drivers, or services. In one particular embodiment, the system is implemented as a service that executes as one or more processes or tasks on a server device so as to provide the described capabilities to one or more client devices over a network. However, the system need not necessarily be accessed over a network and could, in some embodiments, be implemented by one or more app or applications on a single device or distributed between a mobile device and a computer, for example.

Figure 8:
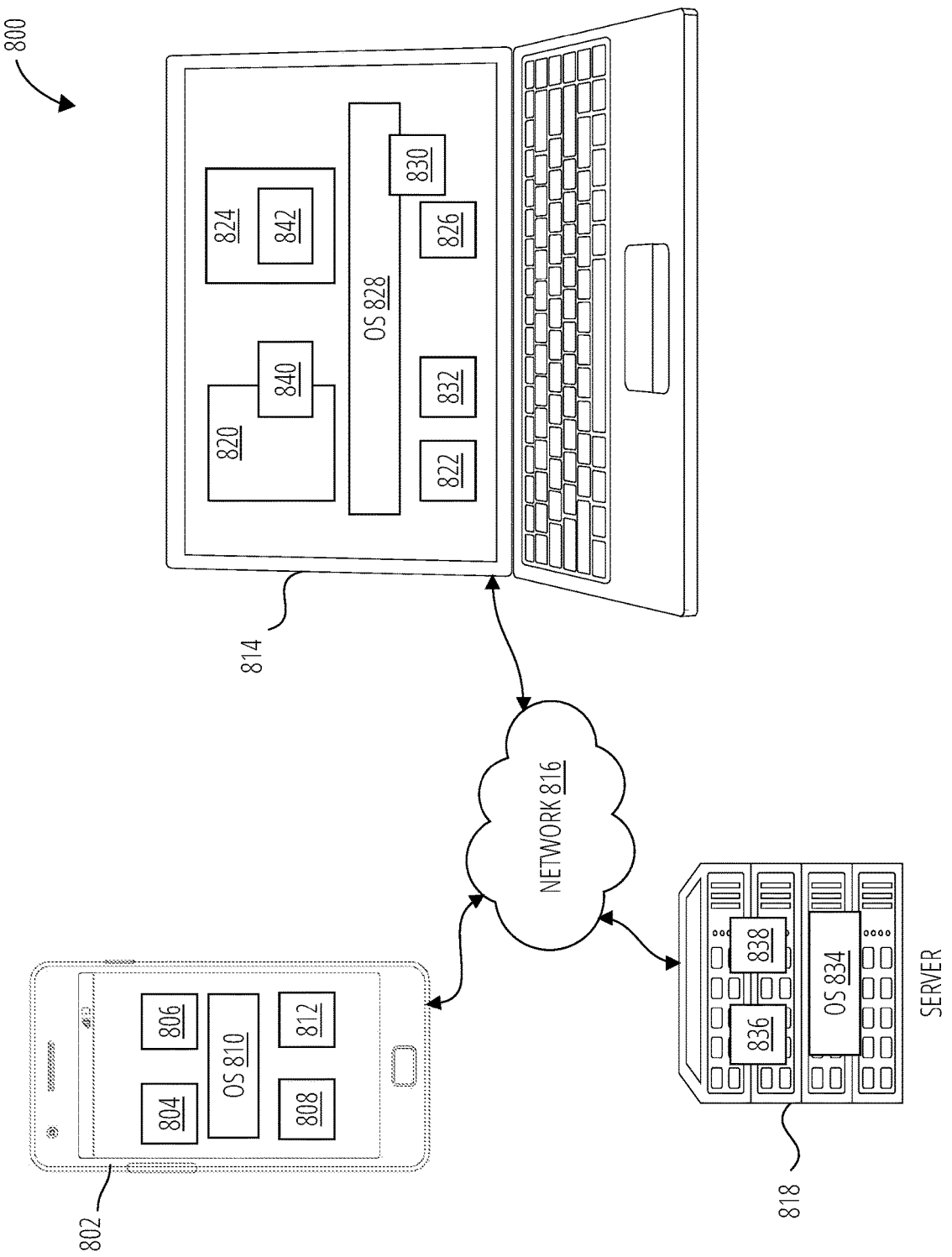
FIG. 8 a client server network configuration 800 in accordance with one embodiment.

Referring to FIG. 8, a client server network configuration 800 illustrates various computer hardware devices and software modules coupled by a network 816 in one embodiment. "Software" refers to logic implemented as instructions to a programmable device or component of a device (e.g., a programmable processor, controller). Software may be source code, object code, executable code, machine language code. Unless otherwise indicated by context, software shall be understood to mean the embodiment of said code in a machine memory or hardware component, including "firmware" and micro-code. "Instructions" in this disclosure refers to symbols representing commands for execution by a device using a processor, microprocessor, controller, interpreter, or other programmable logic. Broadly, "instructions" may mean source code, object code, and executable code. "Instructions" herein is also meant to include commands embodied in programmable read-only memories (EPROM) or hard coded into hardware (e.g., 'micro-code') and like implementations wherein the instructions are configured into a machine memory or other hardware component at manufacturing time of a device. "Interpreter" refers to logic that directly executes instructions written in a source code scripting language, without requiring the instructions to a priori be compiled into machine language. An interpreter translates the instructions into another form, for example into machine language, or into calls to internal functions and/or calls to functions in other software modules. "Programmable device" in this disclosure refers to any logic (including hardware and software logic) whose operational behavior is configurable with instructions.

Each device includes a native operating system, typically pre-installed on its non-volatile random access memory (RAM), and a variety of software applications or apps for performing various functions. "App" refers to a type of application with limited functionality, most commonly associated with applications executed on mobile devices. Apps tend to have a more limited feature set and simpler user interface than applications as those terms are commonly understood in the art. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is needed in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices. "Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

The mobile programmable device 802 comprises a native operating system 810 and various apps (e.g., app 804 and app 806). A computer 814 also includes an operating system 828 that may include one or more libraries of native routines to run executable software on that device. The computer 814 also includes various executable applications (e.g., application 820 and application 824). "Executable" refers to a file comprising executable code. If the executable code is not interpreted computer code, a loader is typically used to load the executable for execution by a programmable device. "Interpreted computer code" in this disclosure refers to instructions in a form suitable for execution by an interpreter. The mobile programmable device 802 and computer 814 are configured as clients on the network 816. A server 818 is also provided and includes an operating system 834 with native routines specific to providing a service (e.g., service 838 and service 836) available to the networked clients in this configuration. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

As is well known in the art, an application, an app, or a service may be created by first writing computer code to form a computer program, which typically comprises one or more computer code sections or modules. "Computer program" in this disclosure is another term for 'application' or 'app'. "Module" refers to logic organized in such a way as to comprise defined entry and exit points at its interface, for activation of functionality of the module by logic external to the module. "Computer code section" refers to one or more instructions. "Computer code" refers to any of source code, object code, or executable code. Computer code may comprise instructions in many forms, including source code, assembly code, object code, executable code, and machine language. "Machine language" refers to instructions in a form that is directly executable by a programmable device without further translation by a compiler, interpreter, or assembler. In digital devices, machine language instructions are typically sequences of ones and zeros. "Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it may be directly applied to a programmable device (an interpreter) for execution, even though the interpreter itself may further transform the interpreted computer code into machine language instructions. "Object code" refers to the computer code output by a compiler or as an intermediate output of an interpreter. Object code often takes the form of machine language or an intermediate language such as register transfer language (RTL). "Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. "Source code" refers to a high-level textual computer language that requires either interpretation or compilation in order to be executed by a device. Computer programs often implement mathematical functions or algorithms and may implement or utilize one or more application program interfaces. "Application program interface" refers to instructions implementing entry points and return values to a module. "Algorithm" refers to any set of instructions configured to cause a machine to carry out a particular function or process.

A compiler is typically used to transform source code into object code and thereafter a linker combines object code files into an executable application, recognized by those skilled in the art as an "executable". "Linker" refers to logic that inputs one or more object code files generated by a compiler or an assembler and combines them into a single executable, library, or other unified object code output. One implementation of a linker directs its output directly to machine memory as executable code (performing the function of a loader as well). "Compiler" refers to logic that transforms source code from a high-level programming language into object code or in some cases, into executable code. The distinct file comprising the executable would then be available for use by the computer 814, mobile programmable device 802, and/or server 818. "File" refers to a unitary package for storing, retrieving, and communicating data and/or instructions. A file is distinguished from other types of packaging by having associated management metadata utilized by the operating system to identify, characterize, and access the file. Any of these devices may employ a loader to place the executable and any associated library in memory for execution. "Loader" refers to logic for loading programs and libraries. The loader is typically implemented by the operating system. A typical loader copies an executable into memory and prepares it for execution by performing certain transformations, such as on memory addresses. The operating system executes the program by passing control to the loaded program code, creating a task or process. "Process" refers to software that is in the process of being executed on a device. "Task" refers to one or more operations that a process performs. An alternate means of executing an application or app involves the use of an interpreter 842.

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. "Driver" refers to low-level logic, typically software, that controls components of a device. Drivers often control the interface between an operating system or application and input/output components or peripherals of a device, for example. For example, a driver 808 or driver 812 on the mobile programmable device 802 or computer 814 (e.g., driver 822 and driver 832) might enable wireless headphones to be used for audio output(s) and a camera to be used for video inputs. Any of the devices may read and write data from and to files (e.g., file 826 or file 830) and applications or apps may utilize one or more plug-ins 840 to extend their capabilities (e.g., to encode or decode video files). "Plug-in" refers to software that adds features to an existing computer program without rebuilding (e.g., changing or re-compiling) the computer program. Plug-ins are commonly used for example with Internet browser applications.

The network 816 in the client server network configuration 800 may be of a type understood by those skilled in the art, including a Local Area Network (LAN), Wide Area Network (WAN), Transmission Communication Protocol/Internet Protocol (TCP/IP) network, and so forth. These protocols used by the network 816 dictate the mechanisms by which data is exchanged between devices.

Machine Embodiments

Figure 9:
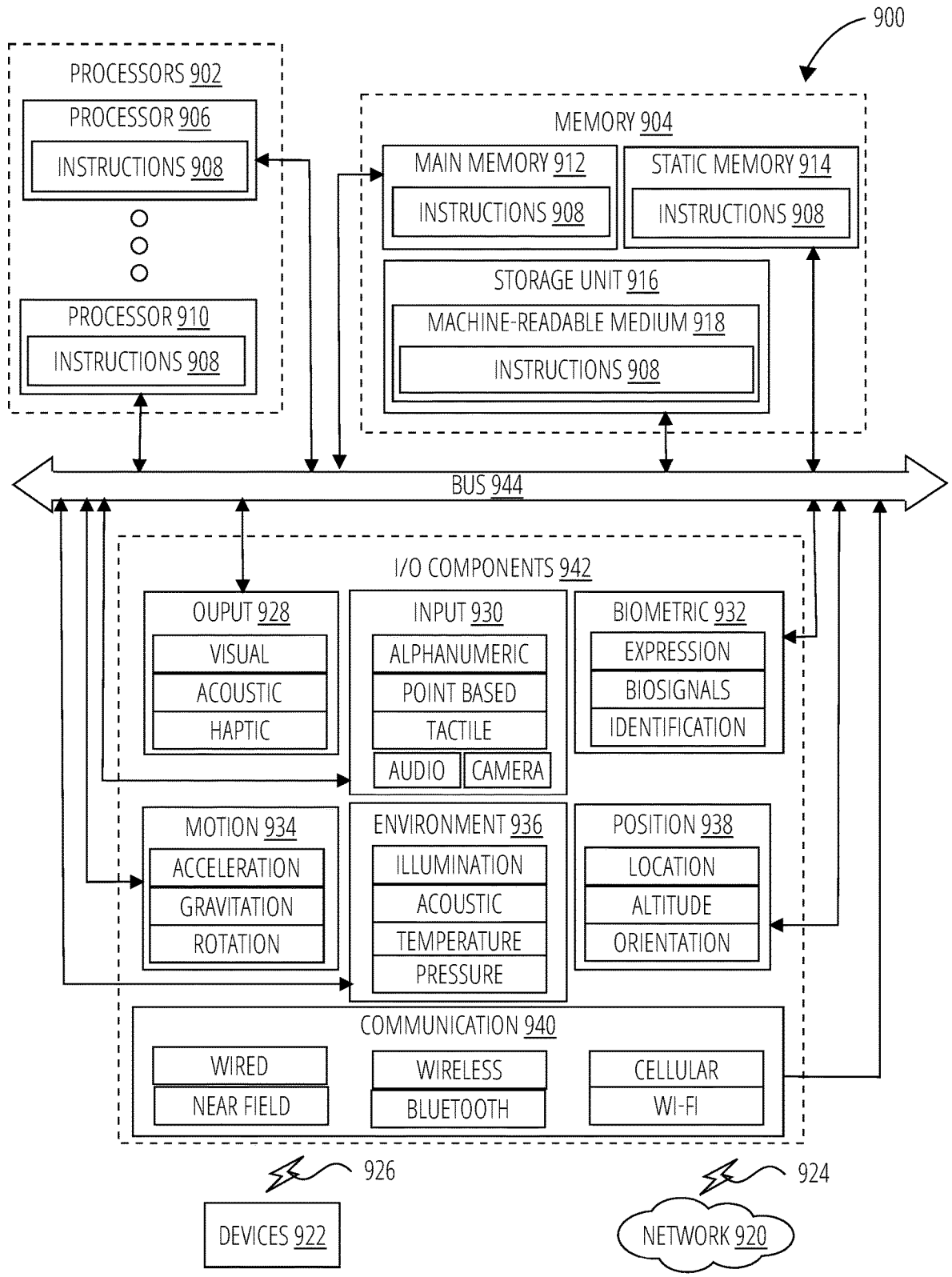
FIG. 9 depicts a machine 900 in the form of a computer system within which a set of instructions may be executed for causing the machine to perform any one or more of the methodologies discussed herein, according to an example embodiment.

FIG. 9 depicts a diagrammatic representation of a machine 900 in the form of a computer system within which logic may be implemented to cause the machine to perform any one or more of the functions or methods disclosed herein, according to an example embodiment.

Specifically, FIG. 9 depicts a machine 900 comprising instructions 908 (e.g., a program, an application, an applet, an app, or other executable code) for causing the machine 900 to perform any one or more of the functions or methods discussed herein. For example, the instructions 908 may cause the machine 900 to implement one or more modules of the analytical systems 202, decision system 204, transformational module 508, transformational module interfaces 600, etc. The instructions 908 configure a general, non-programmed machine into a particular machine 900 programmed to carry out said functions and/or methods.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while a single machine 900 is depicted, the term "machine" shall also be taken to include a collection of machines 200 that individually or jointly execute the instructions 908 to perform any one or more of the methodologies or subsets thereof discussed herein.

The machine 900 may include processors 902, memory 904, and I/O components 942, which may be configured to communicate with each other such as via one or more bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 906 and processor 910) to execute the instructions 908. The term "processor" is intended to include multi-core processors that may comprise two or more independent processors (sometimes referred to as "cores") that may execute instructions contemporaneously. Although FIG. 9 depicts multiple processors 902, the machine 900 may include a single processor with a single core, a single processor with multiple cores (e.g., a multi-core processor), multiple processors with a single core, multiple processors with multiples cores, or any combination thereof.

The memory 904 may include one or more of a main memory 912, a static memory 914, and a storage unit 916, each accessible to the processors 902 such as via the bus 944. The main memory 912, the static memory 914, and storage unit 916 may be utilized, individually or in combination, to store the instructions 908 embodying any one or more of the functionality described herein. The instructions 908 may reside, completely or partially, within the main memory 912, within the static memory 914, within a machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones will likely include a touch input device or other such input mechanisms, while a headless server machine will likely not include such a touch input device. It will be appreciated that the I/O components 942 may include many other components that are not shown in FIG. 9. The I/O components 942 are grouped according to functionality merely for simplifying the following discussion and the grouping is in no way limiting. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 942 may include biometric components 932, motion components 934, environmental components 936, or position components 938, among a wide array of possibilities. For example, the biometric components 932 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a global positioning system or GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 may include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a universal serial bus or USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 904, main memory 912, static memory 914, and/or memory of the processors 902) and/or storage unit 916 may store one or more sets of instructions and data structures (e.g., software) embodying or utilized by any one or more of the methodologies or functions described herein. These instructions (e.g., the instructions 908), when executed by processors 902, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 920 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 920 or a portion of the network 920 may include a wireless or cellular network, and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 908 and/or data generated by or received and processed by the instructions 908 may be transmitted or received over the network 920 using a transmission medium via a network interface device (e.g., a network interface component included in the communication components 940) and utilizing any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the machine 900, and/or data generated by execution of the instructions 908, and/or data to be operated on during execution of the instructions 908, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Figure 10:
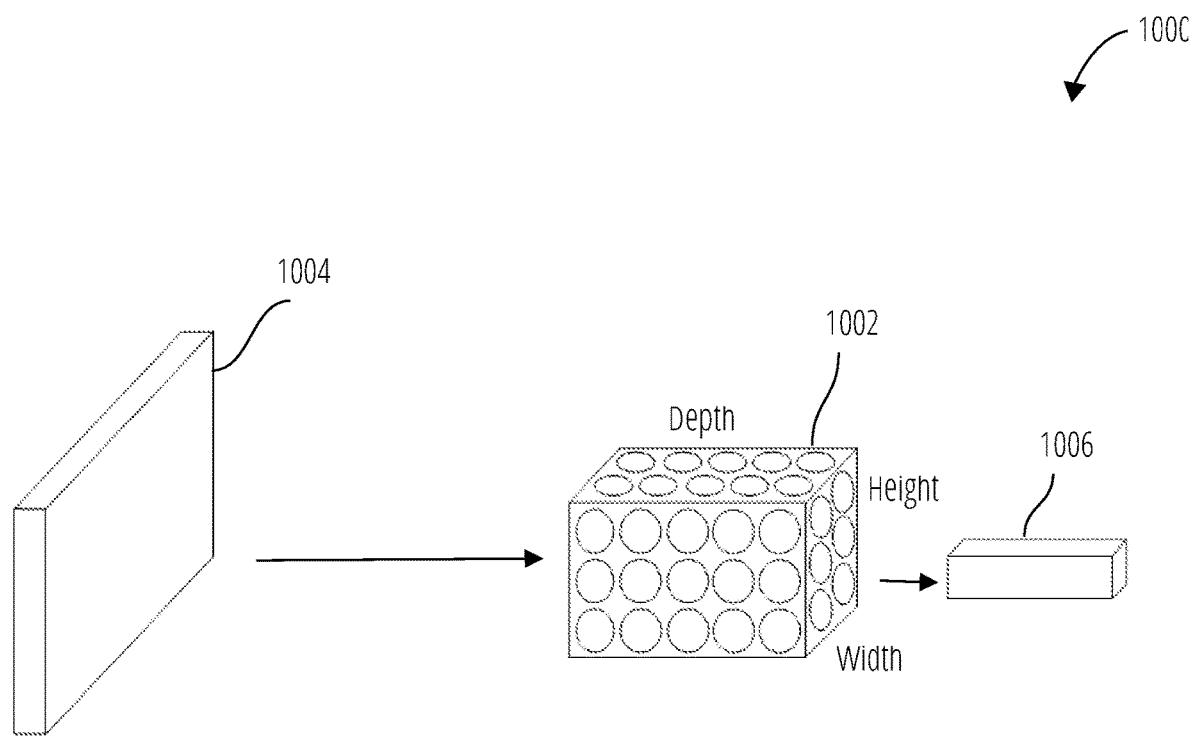
FIG. 10 depicts a convolutional neural network 1000 in accordance with one embodiment.

FIG. 10 depicts an exemplary convolutional neural network 1000. The convolutional neural network 1000 comprises a three dimensional neuron configuration (width, height, depth), as depicted in convolutional layer 1002. Layers of the convolutional neural network 1000 transform a 3D volume of inputs to a 3D output volume of neuron activations. In this example, the input layer 1004 encodes the image, therefore its width and height are configured to the dimensions of the image, and the depth of the 104 is configured to three (e.g., for Red, Green, and Blue channels). The convolutional layer 1002 further transforms the outputs of the input layer 1004. The output layer 1006 transforms the outputs of the convolutional layer 1002 into one or more classifications of the image content.

Figure 11:
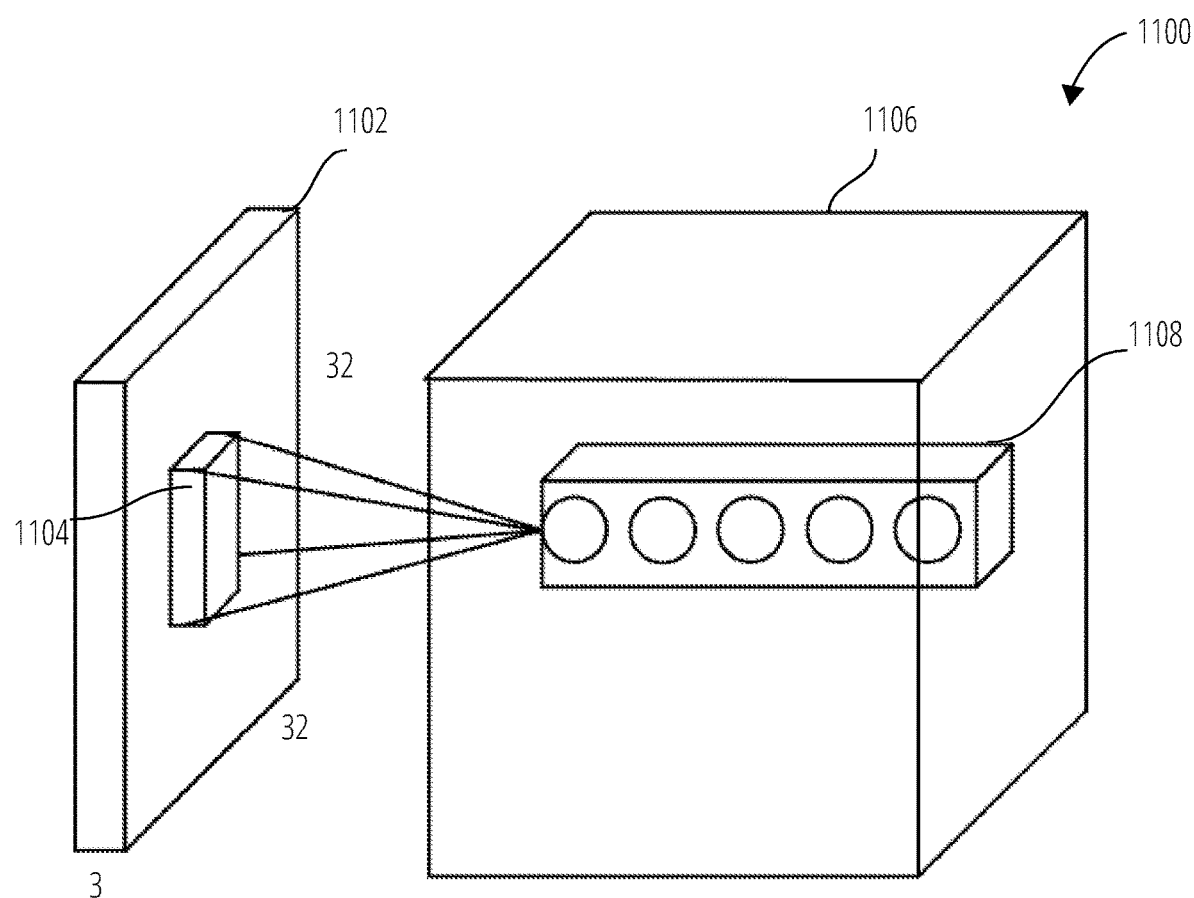
FIG. 11 depicts a convolutional neural network layers 1100 in accordance with one embodiment.

FIG. 11 depicts exemplary convolutional neural network layers 1100 in more detail. An example subregion of the input layer region 1104, from a tile 1102 of the input layer 1004 corresponding to a tile of an image, is transformed by a convolutional layer subregion 1108 in the convolutional layer 1106. The tile 1102 in this example is 32×32 neurons (e.g., corresponding to a 32×32 tile 1102), and three neurons deep (e.g., three color channels per pixel of the input region input to the tile 1102). Each neuron in the convolutional layer 1106 is coupled to a local region in the tile 1102 spatially (e.g., in height and width), but to the full depth (i.e., to all color channels if the input is an image). There are multiple neurons (five in this example) along the depth of the convolutional layer subregion 1108 that analyze the subregion of the input layer region 1104 of the tile 1102, in which each neuron of the convolutional layer subregion 1108 may receive inputs from every neuron of the subregion of the input layer region 1104.

Figure 12:
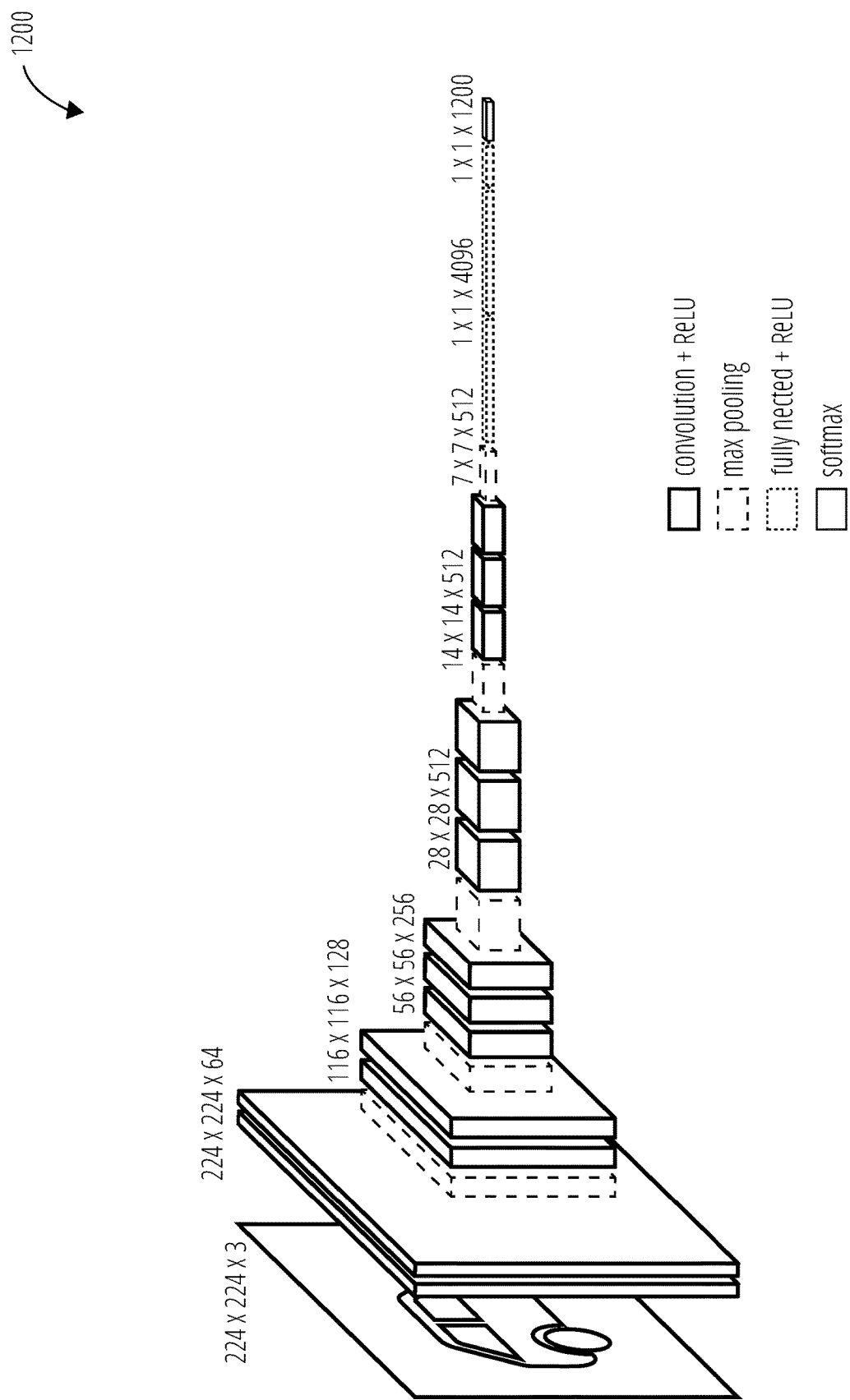
FIG. 12 depicts a VGG network 1200 architecture known as VGG16 in one embodiment.

FIG. 12 depicts a visual geometry group (VGG) network architecture in one embodiment. The model achieves 92.7% top-5 test accuracy on ImageNet, a dataset of millions of images belonging to thousands of classes. VGG16 utilizes multiple 3×3 kernel-sized filters in a series of convolutional layers.

The input in this example is a 224×224 RGB image. The image is passed through a stack of convolutional (conv) layers, each with filters of a 3×3 receptive field. In one configuration, the model also utilizes 1×1 convolution filters to provide a linear transformation of the input channels (followed by a non-linearity layer). The convolution stride is fixed to 1 pixel; the spatial padding is set such that the spatial resolution is preserved after convolution, i.e. the padding is 1-pixel for the 3×3 conv layers. Spatial pooling is carried out by five max-pooling layers, which follow some of the conv layers (not all the conv layers are followed by max-pooling). Max-pooling is performed over a 2×2 pixel window, with stride 2.

Three fully connected (FC) layers follow a stack of convolutional layers (which has a different depth in different configurations of the model). The first two FC layers comprise 4096 channels each. The third performs 1000-way ImageNet Large Scale Visual Recognition Challenge (ILSVRC) classification and thus comprises one channel per class. The final layer is a Softmax layer. "Softmax function" in this disclosure refers to a function of the form $f(x_i) = \exp(x_i)/\text{sum}(\exp(x))$ where the sum is taken over a set of x. Softmax is used at different layers (often at the output layer) of artificial neural networks to predict classifications for inputs to those layers. The softmax function calculates the probabilities distribution of the event $x_i$ over 'n' different events. In general sense, this function calculates the probabilities of each target class over all possible target classes. The calculated probabilities are helpful for predicting that the target class is represented in the inputs. The main advantage of using softmax is the output probabilities range. The range will be 0 to 1, and the sum of all the probabilities will be equal to one. If the softmax function is used for multi-classification model it returns the probabilities of each class and the target class will have the high probability. The formula computes the exponential (e-power) of the given input value and the sum of exponential values of all the values in the inputs. Then the ratio of the exponential of the input value and the sum of exponential values is the output of the softmax function.

Hidden layers are equipped with rectification (ReLU) non-linearity. "ReLU" in this disclosure refers to a rectifier function, an activation function defined as the positive part of its input. It is also known as a ramp function and is analogous to half-wave rectification in electrical signal theory. ReLU is a popular activation function in deep neural networks. Most VGG16 configurations do not utilize Local Response Normalization (LRN), as such normalization does not improve the performance but incurs increased memory consumption and computation time.

Figure 13:
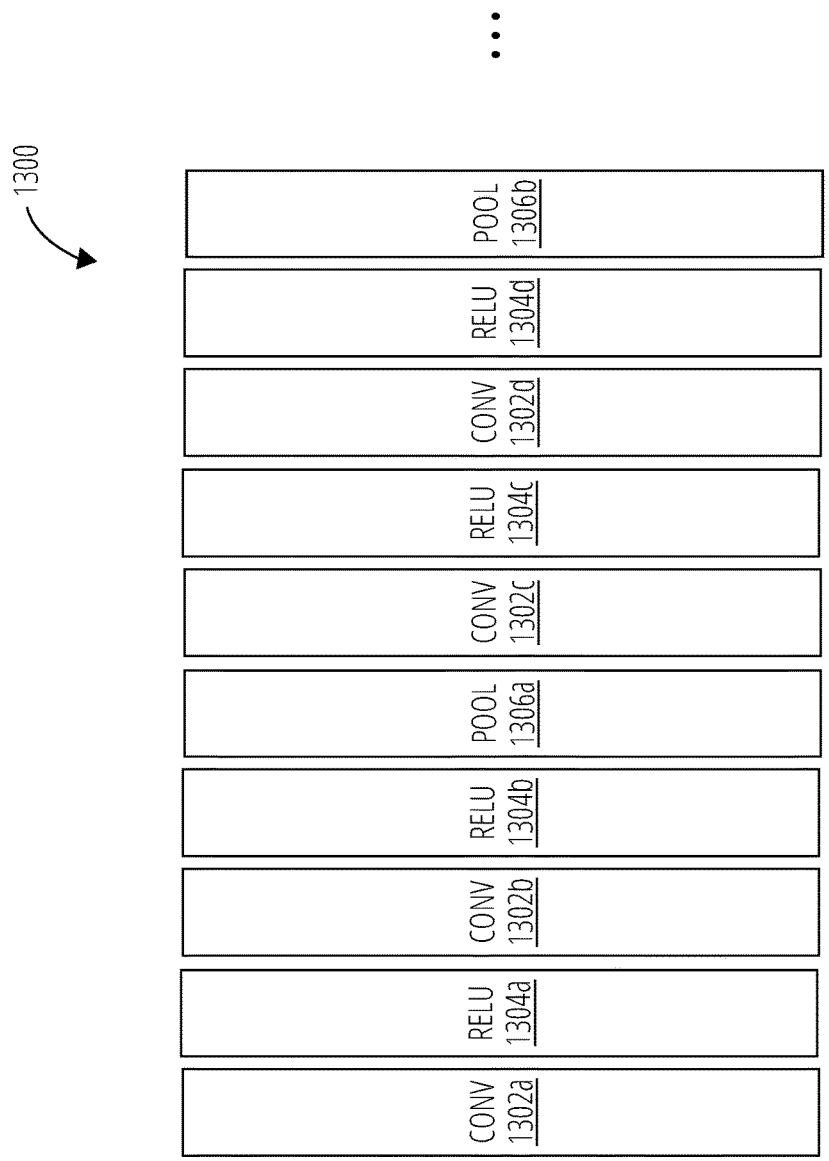
FIG. 13 depicts a VGG net 1300 in accordance with one embodiment.
Figure 14:
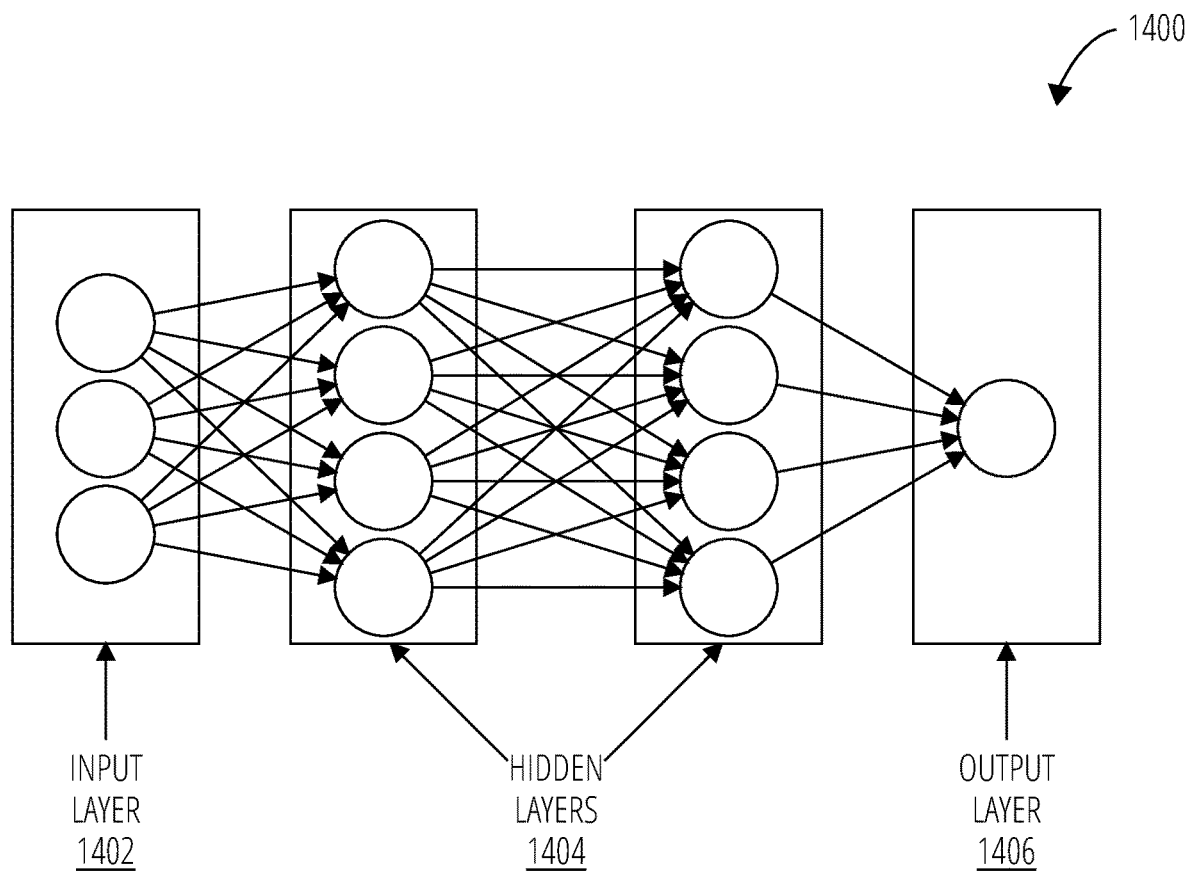
FIG. 14 illustrates a basic deep neural network 1400 in accordance with one embodiment.

FIG. 13 depicts a form of a CNN known as a VGG net 1300. The initial convolution layer 1302a stores the raw image pixels and the final pooling layer 1306b determines the class scores. The intermediate convolution layers (convolution layer 1302b, convolution layer 1302c, and convolution layer 1302d) and rectifier activations (RELU layer 1304a, RELU layer 1304b, RELU layer 1304c, and RELU layer 1304d) and intermediate pooling layers (pooling layer 1306a, pooling layer 1306b) along the processing path are also depicted.

The VGG net 1300 replaces the (often large) single-layer filters of basic CNNs with multiple smaller-sized (e.g., 3×3) filters in series. With a given receptive field (the effective area size of the input image), multiple stacked smaller-size filters may perform better at image feature classification than a single layer with a larger filter size, because multiple non-linear layers increase the depth of the network which enables it to learn more complex features. In a VGG net 1300 each pooling layer may be small, e.g., 2×2.

A basic deep neural network 1400 is based on a collection of connected units or nodes called artificial neurons which loosely model the neurons in a biological brain. Each connection, like the synapses in a biological brain, may transmit a signal from one artificial neuron to another. An artificial neuron that receives a signal may process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 1402), to the last layer (the output layer 1406), possibly after traversing one or more intermediate layers, called hidden layers 1404.

Figure 15:
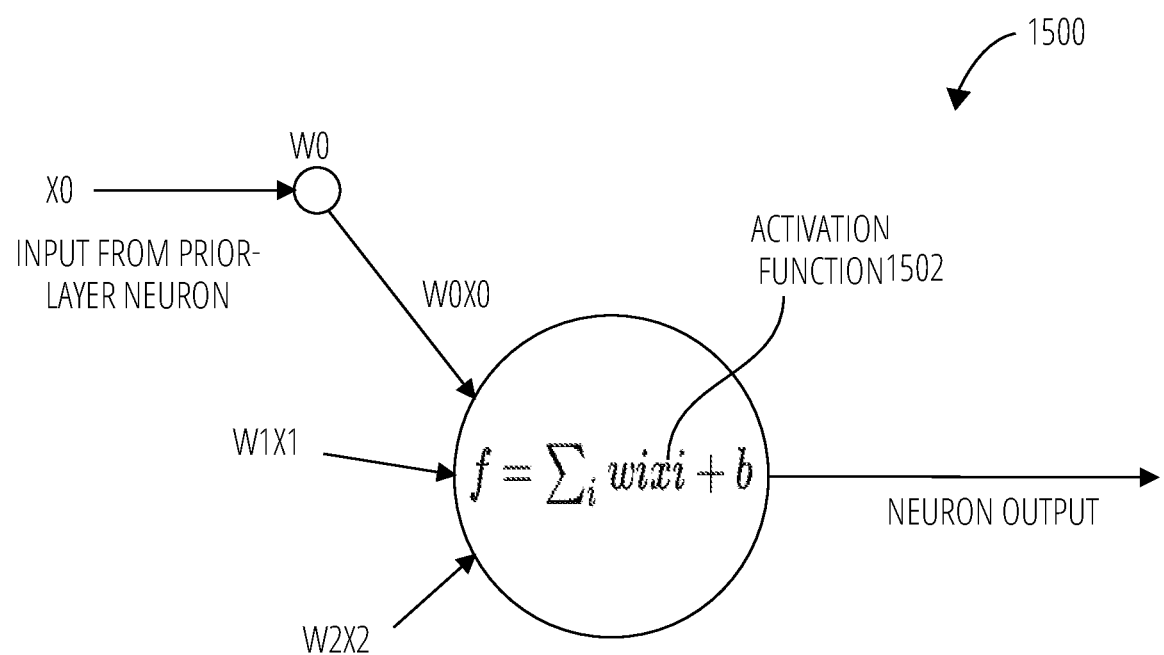
FIG. 15 illustrates an artificial neuron 1500 in accordance with one embodiment.

Referring to FIG. 15, an artificial neuron 1500 receiving inputs from predecessor neurons consists of the following components:

inputs $x_i$;

weights $w_i$ applied to the inputs;

an optional threshold (b), which stays fixed unless changed by a learning function; and an activation function 1502 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 1502 often has the form of a sum of products of the weighted values of the inputs of the predecessor neurons. "Sigmoid function" in this disclosure refers to a function of the form $f(x)=1/(\exp(-x))$. The sigmoid function is used as an activation function in artificial neural networks. It has the property of mapping a wide range of input values to the range 0-1, or sometimes −1 to 1. "Hyperbolic tangent function" in this disclosure refers to a function of the form $\tanh(x)=\sinh(x)/\cosh(x)$. The tanh function is a popular activation function in artificial neural networks. Like the Sigmoid, the tanh function is also sigmoidal ("s"-shaped), but instead outputs values that range (−1, 1). Thus strongly negative inputs to the tanh will map to negative outputs. Additionally, only zero-valued inputs are mapped to near-zero outputs. These properties make the network less likely to get "stuck" during training.

The learning rule is a rule or an algorithm which modifies the parameters of the neural network, in order for a given input to the network to produce a favored output. This learning process typically involves modifying the weights and thresholds of the neurons and connections within the network.

CODE LISTINGS

Listing 1 - Bot Agent Input
```
{
    "bot_name": "problem_description_bot",
    "avatars": [
        "avatar_male",
        "avatar_female"
    ],
    "bot_utterances": [
        {
            "response": [
                "Hi {user_first_name}, good to see you again! I understand you've learned about our company {client_name}'s situation and I know you want to meet with me to discuss your proposal. Let me know what you found out given our company's current situation."
            ],
            "used_in": "question",
            "tags": [
                "supportive",
                "enthusiastic",
                "expert",
                "CEO"
            ]
        }, {
            "response": [
                "{user_first_name}, to make it easier for me to buy into your proposal, it's better to start with a short summary of your analysis of my company {client_name}'s current situation. What problems have you found in our company?",
```

CODE LISTINGS

```
        "What are the various problems that you have
identified at our company?"
        ],
        "used_in": "ask_slot_problem",
        "tags": [
            "apathetic",
            "expert",
            "CEO"
        ]
    }, {
        "response": [
            "That's a very insightful observation. ",
            "Great job on finding out the problem."
        ],
        "used_in": "final_response",
        "tags": [
            "curious",
            "enthusiastic",
            "expert",
            "CEO"
        ]
    }, {
        "response": [
            "That covers some of our problems. ",
            "An in-depth look might be needed in the future to
define the core problems. "
        ],
        "used_in": "final_response",
        "tags": [
            "conservative"
        ]
    }, {
        "response": [
            "That does not seem appropriate. But let's move on. "
        ],
        "used_in": "final_response",
        "tags": [
            "apathetic"
        ]
    }
    ],
    "facial_expression": {
        "supportive": "happy",
        "defensive": "neutral",
        "enthusiastic": "happy",
        "apathetic": "sad",
        "curious": "happy",
        "conservative": "neutral",
        "adventurous": "happy"
    },
    "acoustic": {
        "pitch": "high",
        "tempo": "neutral",
        "tone": "professional"
    }
}
```

LISTING OF DRAWING ELEMENTS 100 bot system
102 bot agent
104 active bot agent
106 user
108 programmatic interface
110 inputs
112 control settings
114 system administrator
116 active bot feedback signal
118 conversation features
120 conversation pivot decision
122 video signal
124 audio signal
126 text signal
128 multi-modal feedback signal
130 user feedback
200 pivot logic
202 analytical system
204 decision system
206 machine learning models
208 conversation context
210 conversation topic
212 hard rules
214 soft rules
216 theme settings
218 bot agent profile
220 machine learning models
222 input vector
300 bot network
302 plurality of bot agents
304 tree structure
400 multi-modal feedback generator
402 machine learning models
404 sentiment
406 wording choice
408 rule engine
410 customization
500 interactive analytical system
502 video analyzer
504 audio analyzer
506 language analyzer
508 transformational module
510 combinatorial logic
512 speech-to-text converter
514 natural language processor
516 database
518 model control
520 model settings
522 multi-session rubric
524 visual features
526 audio features
528 speech features
530 video performance vector feedback
532 audio performance vector feedback
534 speech performance vector feedback
536 current multi-feature performance vector
538 prior multi-feature performance vector
600 transformational module interfaces
602 convolutional neural network
604 convolutional neural network
606 convolutional neural network
608 speech analyzer
610 recurrent neural network
612 other analysis algorithms
614 timebase
616 other audio analysis
618 backpropagation logic
700 routine
702 block
704 block
706 block
708 block
710 block
712 block
714 decision block
716 block
718 block
720 block
722 block
800 client server network configuration
802 mobile programmable device 804 app
806 app
808 driver
810 operating system
812 driver
814 computer
816 network
818 server
820 application
822 driver
824 application
826 file
828 operating system
830 file
832 driver
834 operating system
836 service
838 service
840 plug-in
842 interpreter
900 machine
902 processors
904 memory
906 processor
908 instructions
910 processor
912 main memory
914 static memory
916 storage unit
918 machine-readable medium
920 network
922 devices
924 coupling
926 coupling
928 output components
930 input components
932 biometric components
934 motion components
936 environmental components
938 position components
940 communication components
942 I/O components
944 bus
1000 convolutional neural network
1002 convolutional layer
1004 input layer
1006 output layer
1100 convolutional neural network layers
1102 tile
1104 subregion of the input layer region
1106 convolutional layer
1108 convolutional layer subregion
1200 VGG network
1300 VGG net
1302a convolution layer
1302b convolution layer
1302c convolution layer
1302d convolution layer
1304a RELU layer
1304b RELU layer
1304c RELU layer
1304d RELU layer
1306a pooling layer
1306b pooling layer
1400 basic deep neural network
1402 input layer
1404 hidden layers
1406 output layer
1500 artificial neuron
1502 activation function Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory, machine-readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method comprising:
receiving, by an active bot agent, inputs from a user, wherein the inputs from the user comprise at least one of a text signal, an audio signal, a video signal, and combination thereof;
sending, by the active bot agent, the inputs to an analytical system;
transforming, by the analytical system, the inputs into conversation features;
configuring the active bot agent and a plurality of bot agents with control settings including at least one of topic context, conversation context, conversation theme, preferred bot agent profile, defined conversation flow template, quantitative pivot rules, qualitative pivot rules, and combinations thereof, wherein each of the plurality of bot agents is associated with one or more topics;
receiving, by a decision system, the conversation features from the analytical system and the control settings;
transforming, by at least one machine learning model in the decision system, the conversation features into conversation pivot decisions and active bot feedback signals;
on condition no conversation pivot decision was made:
providing an active bot feedback signal to the user representing a reaction to the user input consistent with a currently identified topic; and
on condition a conversation pivot decision was made:
providing the active bot feedback signals to the user representing a reaction to the user input not consistent with the currently identified topic;
applying the conversation pivot decision to select a new active bot agent from the plurality of bot agents, to service a conversation with the user; and
providing new active bot agent feedback signals to the user;
converting the video signal into a plurality of human morphology features with a video analyzer;
converting the audio signal into a plurality of conversation features with an audio analyzer;
utilizing supervised and unsupervised machine learning models to transform the human morphology features and the conversation features into performance metrics for passion, content, and engagement in a current multi-feature performance vector;
generating an integration, by combinatorial logic, of the current multi-feature performance vector and one or more prior multi-feature performance vectors;
configuring one of a plurality of behavioral models as a scoring control on the combinatorial logic such that scores generated for the integration in a multi-session rubric by the combinatorial logic vary according to the behavioral features against model configured as a scoring control for combinatorial logic;
wherein the multi-session rubric comprises a plurality of second-level performance scores grouped within top-level categories of passion, content, and engagement;
applying at least one of the multi-session rubric, current multi-feature performance vector and one or more prior multi-feature performance vectors to the decision system for determination of conversation pivot decisions in the conversation between the user and the active bot agent.

2. The method of claim 1, further comprising applying the conversation pivot decision by backpropagation logic in a closed-loop technique to the video analyzer and the audio analyzer.

3. A system comprising:
a plurality of bot agents;
an active bot agent;
a processor; and
a memory storing instructions that, when executed by the processor, configure the apparatus to:

receive, by the active bot agent, inputs from a user, wherein the inputs from the user comprise at least one of a text signal, an audio signal, a video signal, and combination thereof;

send, by the active bot agent, the inputs to an analytical system;

transform, by the analytical system, the inputs into conversation features;

configure the active bot agent and the plurality of bot agents with control settings including at least one of topic context, conversation context, conversation theme, preferred bot agent profile, defined conversation flow template, quantitative pivot rules, qualitative pivot rules, and combinations thereof, wherein each of the plurality of bot agents is associated with one or more topics;

receive, by a decision system, the conversation features from the analytical system and the control settings;

transform, by at least one machine learning model in the decision system, the conversation features into conversation pivot decision and active bot feedback signals;

on condition no conversation pivot decision was made:
provide an active bot feedback signal to the user representing a reaction to the user input consistent with a currently identified topic; and on condition a conversation pivot decision was made:
provide the active bot feedback signal to the user representing a reaction to the user input not consistent with the currently identified topic;

apply the conversation pivot decision to select a new active bot agent from the plurality of bot agents, to service a conversation with the user; and provide new active bot agent feedback to the user;

convert the video signal into a plurality of human morphology features with a video analyzer;

convert the audio signal into a plurality of conversation features with an audio analyzer;

utilize supervised and unsupervised machine learning models to transform the human morphology features and the conversation features into performance metrics for passion, content, and engagement in a current multi-feature performance vector;

generate an integration, by combinatorial logic, of the current multi-feature performance vector and one or more prior multi-feature performance vectors;

configure one of a plurality of behavioral models as a scoring control on the combinatorial logic such that scores generated for the integration in a multi-session rubric by the combinatorial logic vary according to the behavioral features against model configured as a scoring control for combinatorial logic;

wherein the multi-session rubric comprises a plurality of second-level performance scores grouped within top-level categories of passion, content, and engagement;

apply at least one of the multi-session rubric, current multi-feature performance vector and one or more prior multi-feature performance vectors to the decision system for determination of conversation pivot decision in the conversation between the user and the active bot agent.

4. The system of claim 3, wherein the instructions further configure the apparatus to apply the conversation pivot decision by backpropagation logic in a closed-loop technique to the video analyzer and the audio analyzer.

* * * * *